United States Patent
Uemura et al.

(10) Patent No.: US 9,617,126 B2
(45) Date of Patent: Apr. 11, 2017

(54) WINCH FOR PIPELAYER AND PIPELAYER EQUIPPED WITH SAME

(71) Applicant: KOMATSU LTD., Tokyo (JP)

(72) Inventors: Takuya Uemura, Hirakata (JP);
Yasuhiko Takeuchi, Katano (JP);
Hiroki Yamamoto, Nishinomiya (JP);
Kazumasa Teramoto, Hirakata (JP)

(73) Assignee: KOMATSU LTD., Tokyo (JP)

( * ) Notice: Subject to any disclaimer, the term of this patent is extended or adjusted under 35 U.S.C. 154(b) by 448 days.

(21) Appl. No.: 14/348,675

(22) PCT Filed: Oct. 31, 2013

(86) PCT No.: PCT/JP2013/079636
§ 371 (c)(1),
(2) Date: Mar. 31, 2014

(87) PCT Pub. No.: WO2015/063939
PCT Pub. Date: May 7, 2015

(65) Prior Publication Data
US 2016/0207744 A1     Jul. 21, 2016

(51) Int. Cl.
*B66C 23/44* (2006.01)
*B66D 1/36* (2006.01)
*F16L 1/028* (2006.01)

(52) U.S. Cl.
CPC ............... *B66C 23/44* (2013.01); *B66D 1/36* (2013.01); *F16L 1/028* (2013.01)

(58) Field of Classification Search
CPC . B66D 1/30; B66D 1/36; B66D 1/365; B66D 1/38; B66D 1/39; B66D 1/40;
(Continued)

(56) References Cited

U.S. PATENT DOCUMENTS 1,984,604 A * 12/1934 Stahl ................. B66D 1/36
242/587.1
3,815,478 A * 6/1974 Axelsson ............ B66D 1/08
91/497
(Continued)

FOREIGN PATENT DOCUMENTS

JP            64-34896 A    2/1989
JP       2002-179337 A    6/2002
(Continued)

OTHER PUBLICATIONS

The International Search Report for the corresponding international application No. PCT/JP2013/079636, issued on Feb. 4, 2014.

*Primary Examiner* — Sang Kim
*Assistant Examiner* — Nathaniel Adams
(74) *Attorney, Agent, or Firm* — Global IP Counselors, LLP

(57) ABSTRACT

A restraining roller of a hook winch has a roller middle part and first and second roller end parts. The roller middle part is formed in a columnar shape. Each of the first and second roller end parts is formed in a roughly circular truncated cone shape. The widths of the first and second roller end parts are greater than the diameter of a wire rope. A difference in diameter between an inner end and outer end of each of the first and second roller end parts is less than the diameter of the wire rope. Taper angles of the first and second roller end parts are different from each other.

13 Claims, 19 Drawing Sheets

(58) Field of Classification Search
CPC .... B66D 1/42; B66D 1/48; B66D 5/16; B66C 23/44; B66C 23/46; F16L 1/028
See application file for complete search history.

(56) References Cited

U.S. PATENT DOCUMENTS

| | | | | |
|---|---|---|---|---|
| 4,057,202 | A * | 11/1977 | Carr, Jr. | B66D 1/36 |
| | | | | 242/157 R |
| 4,071,205 | A * | 1/1978 | Wieschel | B66D 1/30 |
| | | | | 242/602.2 |
| 6,893,189 | B2 | 5/2005 | Matsushita et al. | |
| 2004/0190995 | A1 | 9/2004 | Matsushita et al. | |
| 2011/0024378 | A1 * | 2/2011 | Pleuss | B66C 13/18 |
| | | | | 212/276 |
| 2013/0026431 | A1 | 1/2013 | Uemura et al. | |
| 2013/0187105 | A1 * | 7/2013 | Xydias | B66D 1/30 |
| | | | | 254/277 |

FOREIGN PATENT DOCUMENTS

| | | |
|---|---|---|
| JP | 2004-284768 A | 10/2004 |
| JP | 2006-168874 A | 6/2006 |
| JP | 5205552 B2 | 2/2013 |
| JP | 5205552 B2 | 6/2013 |
| WO | 2012/086695 A1 | 6/2012 |

* cited by examiner

WINCH FOR PIPELAYER AND PIPELAYER EQUIPPED WITH SAME

CROSS-REFERENCE TO RELATED APPLICATIONS

This application is a U.S. National stage application of International Application No. PCT/JP2013/079636, filed on Oct. 31, 2013.

BACKGROUND

Field of the Invention

The present invention relates to a winch for a pipelayer and a pipelayer equipped with the same.

Background Information

A pipelayer is a work vehicle for laying pipes in a construction site of pipelines for transporting oil or natural gas. Many pipelayers are tractor-based vehicles, and each is equipped with a winch and a counterweight on one width directional (transverse directional) end thereof while being equipped with a boom suspended by a wire rope released and stretched from the winch on the other width directional end thereof. In a construction site of pipelines, a plurality of pipelayers are aligned, and each lifts up a pipe by causing the winch to wind up the wire rope. The winch is coupled to a hydraulic motor and is driven by means of hydraulic pressure.

To prevent occurrence of uneven winding in winding up a wire rope onto a drum in such a winch, generally employed is a method of reducing a fleet angle defined as an angle formed by a winch drum and a wire rope released and stretched from the winch drum. This is due to the following: in winding up the wire rope, a thrust directional force is generated and the wire rope tries to move from an end of the drum towards the middle of the drum; however, when the fleet angle is increased, the force is increased and the wire rope inappropriately moves; and thus, uneven winding is likely to be caused. Moreover, as a method of preventing occurrence of uneven winding, various methods are employed, including that the drum is provided with a columnar roller for restraining the wire rope on the drum surface (e.g., see Japan Laid-open Patent Application Publication No. JP-A-S64-34896).

SUMMARY

However, the aforementioned well-known method has a drawback as described below.

In the pipelayer, the boom and the winch are installed in the narrow width direction of the tractor. Hence, chances are that the fleet angle is increased. When the fleet angle becomes greater than a predetermined angle, uneven winding is likely to be caused as described above.

Moreover, in the well-known winch, when the wire rope is restrained too strongly by the aforementioned roller, the wire rope cannot move from an end of the drum towards the middle of the drum. Hence, chances are that the wire rope is massively wound about the end portion of the drum. By contrast, when the wire rope is restrained too weakly by the roller, the wound portions of the wire rope are not aligned side by side from an end of the drum towards the middle of the drum. Hence, chances are that a clearance may be produced between adjacent wound portions of the wire rope. When a winch is used for a pipelayer, this trend becomes remarkable because chances are that the fleet angle is increased as described above.

Incidentally, chances are that a pipelayer is used in an extremely cold area at a temperature of less than minus 40 degrees Celsius. Hence, it is difficult to employ fleet angle control based on minute electronic control.

In consideration of the drawbacks of the well-known winch, the present invention is intended to provide a winch that can suppress occurrence of uneven winding and a pipelayer using the same.

A winch according to a first exemplary embodiment of the present invention includes a drum and a restraining roller. The drum is a member that a wire rope is wound thereabout. The restraining roller is disposed along a width direction of the drum, and restrains the wire rope wound about the drum onto a surface of the drum. The restraining roller includes: a roller part that is formed in a columnar shape; and roller end parts, which are disposed on a first end side and a second end side of the roller part in the width direction, and each of which is formed in a roughly circular truncated cone shape with a radius reduced in proportion to distance from the first end side or the second end side. A width of each roller end part is greater than a diameter of the wire rope, and a difference in diameter between an inner end and an outer end of the each roller end part is less than the diameter of the wire rope. Where a taper angle is defined as an angle formed between a line arranged in parallel to a surface of the roller part and a line arranged in parallel to a surface of the each roller end part in a plan view seen in a direction perpendicular to a center axis of the restraining roller, the taper angle of the roller end part on the first end side and the taper angle of the roller end part on the second end side are different from each other.

Thus, by setting the width of each roller end part to be greater than the diameter of the wire rope, the wire rope can be disposed on the taper shaped portion at least by the amount corresponding to the width thereof. Further, the wire rope can be restrained regardless of the position on the taper shape by setting the difference in radius between the inner end and the outer end of each roller end part to be less than the diameter of the wire rope.

Thus, an outward force (thrust resistive force) is generated to the restrained wire rope by the taper shape. Therefore, even when a force (thrust force) for inwardly moving the wire rope in winding up the wire rope is large, the force can be counteracted and an appropriate thrust force is generated as the resultant force of the thrust force and the thrust resistive force. Accordingly, the wire rope can be appropriately moved inwardly.

In other words, occurrence of uneven winding can be suppressed by generating the appropriate thrust resistive force by the taper shape.

Further, when an angle becomes greater that is (also referred to as a fleet angle and) formed between: a line connecting a sheave and the drum end on the side that the roller end part is disposed; and a perpendicular line from the sheave to the rotational axis of the drum, the force to inwardly pull the wire rope at the end becomes greater, and thereby the thrust force becomes greater. To counteract the thrust force, the thrust resistive force is required to be increased. The thrust resistive force can be increased by increasing the taper angle.

In other words, appropriate inward moving of the wire rope can be implemented by increasing the taper angle in proportion to the increase in the fleet angle.

A winch according to a second exemplary embodiment of the present invention relates to the winch according to the first exemplary embodiment of the present invention, and wherein the drum includes: a drum body that is formed in a columnar shape and that the wire rope is wound thereabout in layers; and flange portions that are disposed on a first end and a second end corresponding to both ends of the drum body. Winding the wire rope in layers means that the wire rope is sequentially disposed on the drum body from the first end toward the second end such that wound portions thereof are disposed side by side, and the wire rope is further sequentially disposed from the second end towards the first end on an upper side of the wound portions disposed side by side such that further wound portions thereof are disposed side by side. A first groove is formed on the second end of the drum body on which the wire rope is moved from a lower layer to an upper layer such that a portion of the wire rope located at an end of the upper layer on the second end side is fitted thereto.

Thus, with the fitting of the wire rope portion located at the end to the groove, it is possible to fix the position of the wire rope at the end. With the fixation of the position of the wire rope portion at the end, when being wound up and inwardly moved, the wire rope can be wound up such that the wound portion thereof is disposed adjacently to the wire rope pardon located at the end.

In other words, it is possible to perform positioning of the wire rope portion serving as the reference in winding up the wire rope. Hence, the wire rope can be orderly wound up.

A winch according to a third exemplary embodiment of the present invention relates to the winch according to the second exemplary embodiment of the present invention, and wherein the flange portion disposed on the second end side has a protruded portion. The protruded portion moves the wire rope portion disposed in the first groove to a second groove formed by a wire rope portion located at an end of the lower layer on the second end side and a wire rope portion disposed adjacently thereto.

Thus, with the protruded portion herein provided, the wire rope portion fixed at the end can be disposed in the second groove formed inwardly adjacent thereto across the wire rope portion located at the end of the lower side layer on the second end side.

Accordingly, the wire rope can be orderly wound up.

A winch according to a fourth exemplary embodiment of the present invention relates to the winch according to the first exemplary embodiment of the present invention, and wherein an angle of less than or equal to 2 degrees is formed as a fleet angle of the wire rope paid out from the surface of the drum in a position opposed to one end of each roller end part that is an end located on an opposed side to the roller part.

In short, where mount grooves, in which the wire rope is disposed, are not formed on the surface of the drum, chances are that, when the aforementioned angle exceeds 2 degrees, the thrust force becomes excessively greater and uneven winding is thereby caused. However, occurrence of uneven winding attributed to the thrust force can be suppressed by forming the taper shape on the part that the angle exceeds 2 degrees.

A winch according to a fifth exemplary embodiment of the present invention relates to the winch according to the first exemplary embodiment of the present invention, and wherein the drum body has a plurality of mount grooves on a surface thereof such that the wire rope is disposed therein. An angle of less than or equal to 4 degrees is formed as a fleet angle of the wire rope paid out from the surface of the drum in a position opposed to one end of each roller end part that is an end located on an opposed side to the roller part.

In short, when the mount grooves are formed on the surface of the drum, chances are that, when the aforementioned angle exceeds 4 degrees, the thrust force becomes excessively greater and uneven winding is thereby caused. However, occurrence of uneven winding attributed to the thrust force can be suppressed by forming the taper shape on the part that the angle exceeds 4 degrees.

A pipelayer according to a sixth exemplary embodiment of the present invention includes a hook and the winch according to any of the first to fifth exemplary embodiments of the present invention for moving up and down. The drum is a drum for hook that the wire rope for moving up and down the hook is wound thereabout.

Thus, it is possible to provide the pipelayer that can suppress occurrence of uneven winding with the simple structure that the taper shape is formed on each end part of the restraining roller for restraining the wire rope wound about the drum.

A pipelayer according to a seventh exemplary embodiment of the present invention relates to the pipelayer according to the sixth exemplary embodiment of the present invention, and includes a sheave, a boom and a drum for boom. The sheave is a member over which the wire rope for moving up and down the hook is wrapped. The boom is a member that the hook is hung therefrom. The drum for boom is concentrically disposed in alignment with the drum for hook, and is a member that a wire rope for raising and lowering the boom is wound thereabout. The sheave has a rotational axis arranged in parallel to a rotational axis of the drum for hook, and is disposed closer to the drum for boom from a width directional center of the drum for hook in a plan view seen in a direction perpendicular to the rotational axes. The roller end part on the first end side is disposed on a side that the drum for boom is disposed. The taper angle of the roller end part on the first end side is less than the taper angle of the roller end part on the second end side.

By thus concentrically disposing the drum for hook and the drum for boom, the sheave cannot be disposed in the middle of the drum for hook in the width direction. Therefore, chances are that the fleet angle becomes greater at the end of the drum for hook. However, occurrence of uneven winding can be suppressed by forming the taper shape on each end part of the restraining roller.

In other words, it is possible to change the position in which the sheave is disposed only by forming the taper shape on each end part of the restraining roller. Accordingly, the position of the sheave can be determined in consideration of arrangement of the other elements. Hence, this makes design easy.

Further, the taper angle is formed smaller in one roller end part located on the drum-for-boom side than in the other roller end part located on the opposite side. Yet further, the fleet angle becomes greater on one end of the drum for hook on one side that one roller end part away from the sheave in distance is disposed than on the other end of the drum for hook on the other side that the other roller end part closer to the sheave in distance is disposed. In other words, the fleet angle becomes less on one end of the drum for hook on the drum-for-boom side than on the other end of the drum for hook on the opposite side.

Thus, occurrence of uneven winding attributed to the thrust force can be suppressed by increasing the taper angle that the fleet angle becomes greater.

According to the exemplary embodiments of the present invention, it is possible to provide a winch that can suppress occurrence of uneven winding and a pipelayer using the same.

DETAILED DESCRIPTION OF EXEMPLARY EMBODIMENTS

A pipelayer according to an exemplary embodiment of the present invention will be hereinafter explained with reference to the drawings.

Schematic Structure of Pipelayer 1

Figure 1:
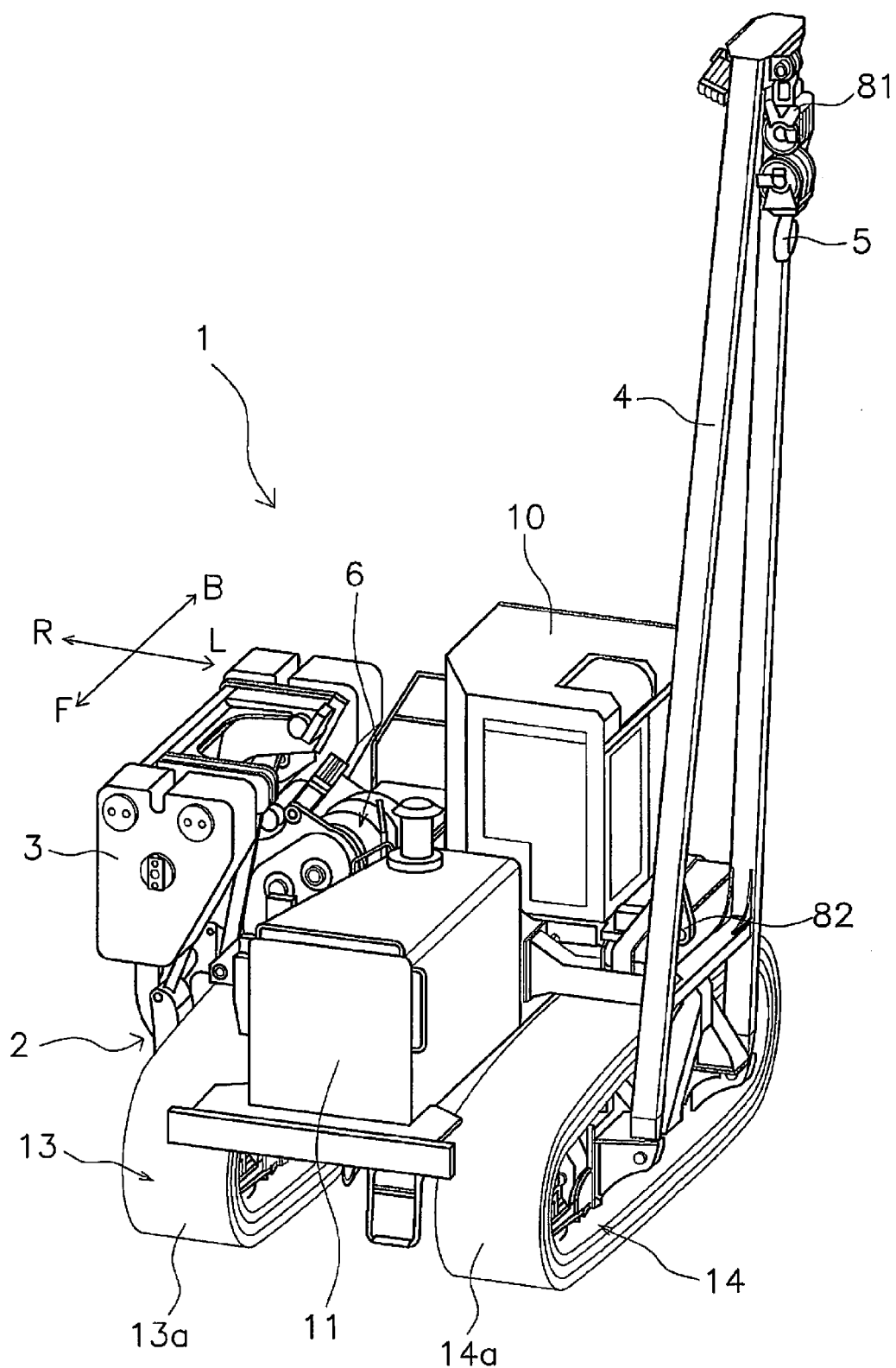
FIG. 1 is an external view of a pipelayer according to an exemplary embodiment of the present invention.

FIG. 1 is an external view of a pipelayer 1 of the present exemplary embodiment.

The pipelayer 1 includes a vehicle main body 2, a counterweight 3, a boom 4, a hook 5 and a winch unit 6. It should be noted that a wire rope 83 for the hook 5 (to be described) and a wire rope 73 for the boom 4 (to be described) are not illustrated in FIG. 1 for easy understanding of the drawing. Further, in the following explanation, a back-and-forth direction means the back-and-forth direction of the vehicle body seen from an operator seated in a cab 10. On the other hand, a right-and-left direction or a lateral direction means the vehicle width direction of the pipelayer 1 and corresponds to the right-and-left direction seen from the operator seated in the cab 10. Yet further, in FIG. 1, a forward direction is depicted with an arrow F; a backward direction is depicted with an arrow B; a rightward direction is depicted with an arrow R; and a leftward direction is depicted with an arrow L.

The vehicle main body 2 includes an engine compartment 11, the cab 10, a pair of drive units 13 and 14 and so forth. An engine (to be described) is disposed in the engine compartment 11. The cab 10 and devices such as a hydraulic pump (not illustrated in the drawings) are disposed rearwards of the engine compartment 11. The drive unit 13 includes a crawler belt 13a, whereas the drive unit 14 includes a crawler belt 14a. When the crawler belts 13a and 14a are driven by means of the driving force from the engine, the pipelayer 1 is caused to travel.

The width directional length of the vehicle main body 2 is less than the back-and-forth directional length thereof.

Figure 2:
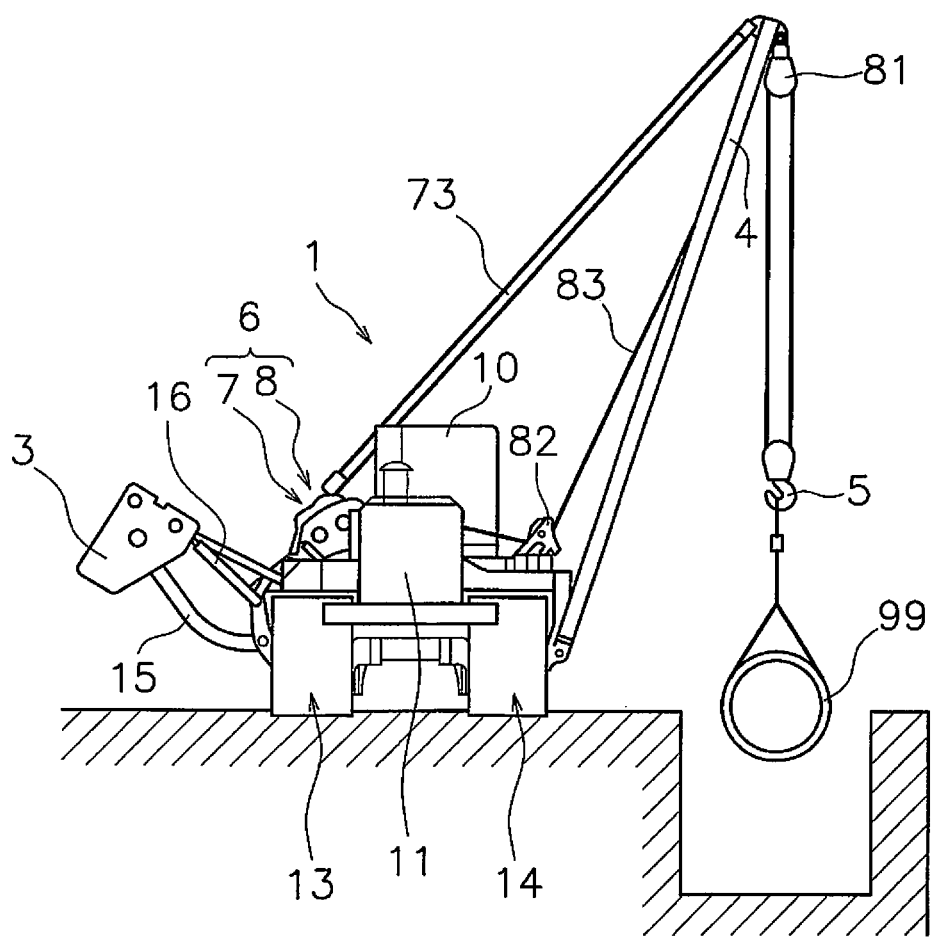
FIG. 2 is a front view of a condition that the pipelayer illustrated in FIG. 1 is performing a pipe laying work.

The counterweight 3 is attached to the right lateral surface side of the vehicle main body 2. FIG. 2 is a front view illustrating a condition that the pipelayer 1 is performing a work of laying a pipe 99. The counterweight 3 is attached to the vehicle main body 2 through an arm member 15. The counterweight 3 is mounted while being movable in the vehicle width direction by means of hydraulic cylinders 16. In a lifting work of the pipe 99, the pipelayer 1 is capable of maintaining vehicle body balance by adjusting the distance of the counterweight 3 with respect to the vehicle main body 2.

The boom 4 is attached to the left lateral surface side of the vehicle main body 2. In other words, the boom 4 is attached to the lateral part of the vehicle main body 2 on the opposite side of the counterweight 3. The boom 4 is suspended by the wire rope released and stretched from the winch unit 6 to be described. The lower part of the boom 4 is pivotably attached to the vehicle main body 2 through shafts disposed along the back-and-forth direction of the vehicle main body 2. Further, the hook 5 is hung from the tip end of the boom 4 in order to lift a pipe as a load.

Winch Unit 6

Figure 3:
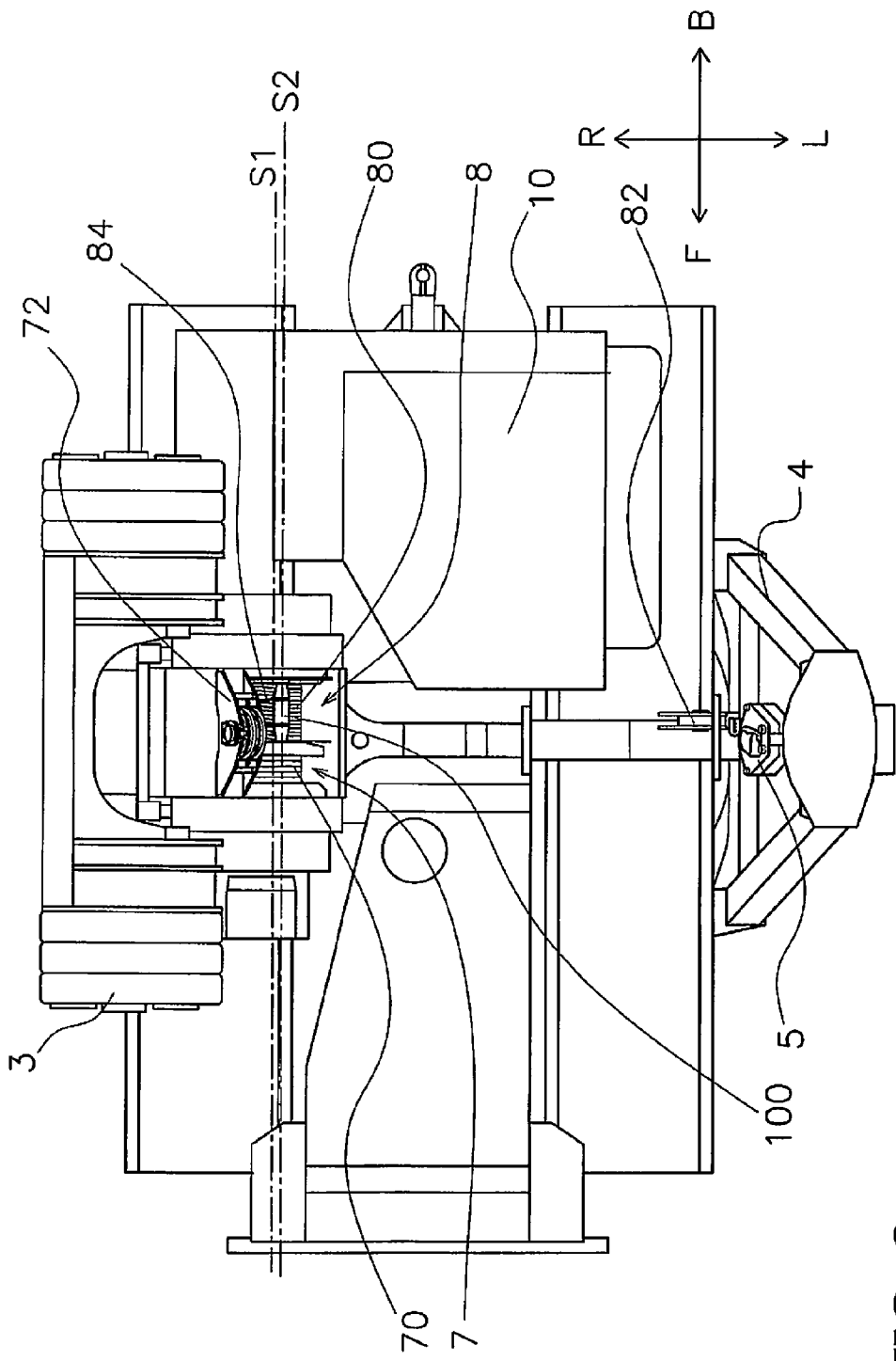
FIG. 3 is a plan view of the pipelayer illustrated in FIG. 1.
Figure 4:
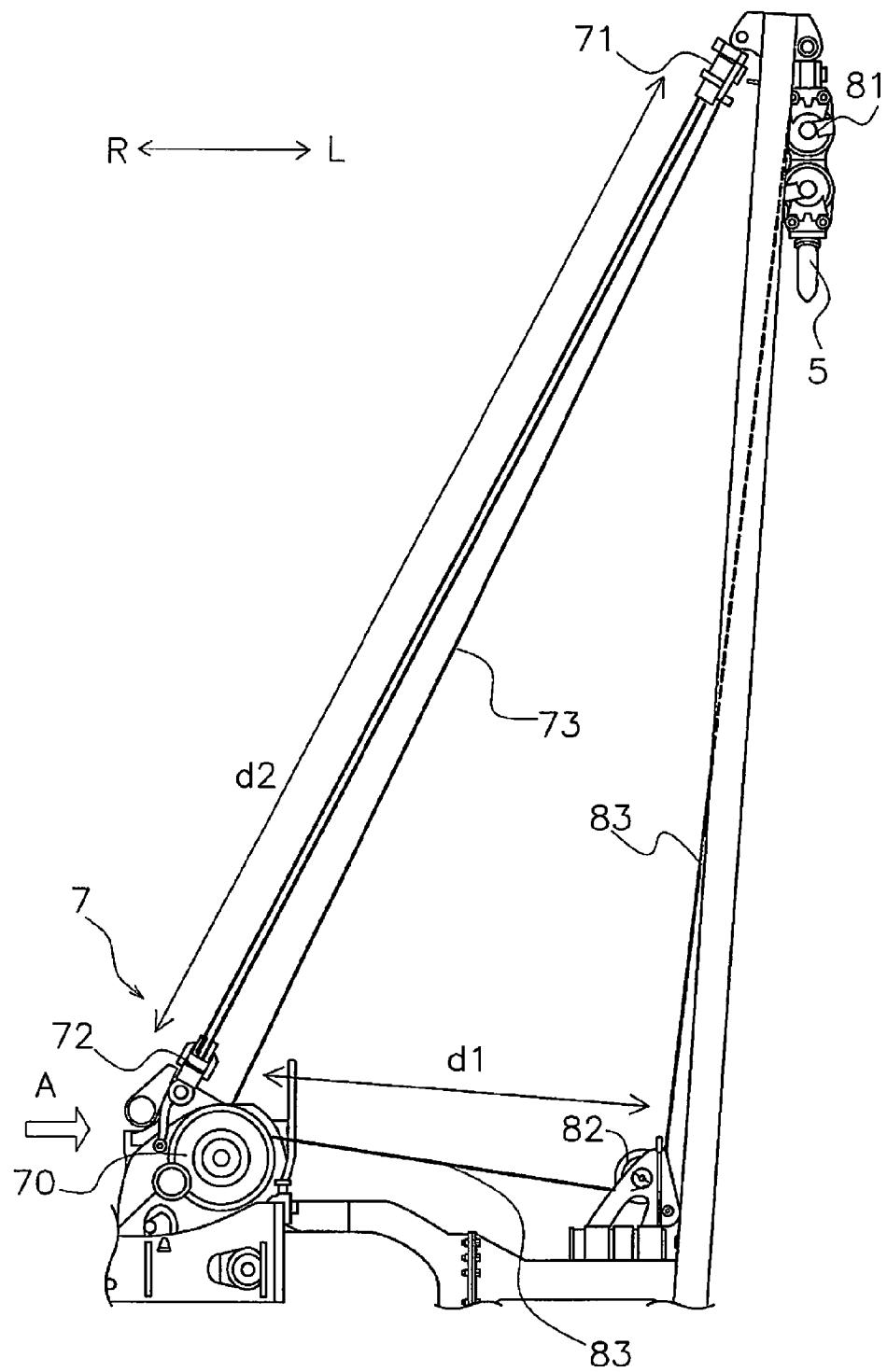
FIG. 4 is a front view of the pipelayer illustrated in FIG. 1.

FIG. 3 is a plan view of the pipelayer 1 of the present exemplary embodiment. FIG. 4 is a front view of the pipelayer 1.

As illustrated in FIGS. 1 to 3, the winch unit 6 is a concentric tandem winch unit, and includes a boom winch 7 and a hook winch 8. The winch unit 6 is disposed on the upper surface of the right side of the vehicle main body 2 in opposition to the boom 4, while the rotational axis thereof is arranged in a direction along the back-and-forth direction of the vehicle main body 2. The boom winch 7 is disposed on the front side, whereas the hook winch 8 is disposed on the rear side. The width of the hook winch 8 is several times as large as that of the boom winch 7. Dual winches of the winch unit can be vertically disposed in parallel to each other, but the concentric tandem arrangement is advantageous in that the center of gravity of the pipelayer 1 is lowered.

Boom Winch 7

As illustrated in FIG. 4, the boom winch 7 includes a boom drum 70, a first pulley 71 for the boom, a second pulley 72 for the boom and the wire rope 73.

The wire rope 73 for raising and lowering the boom 4 is wound about the boom drum 70. As illustrated in FIG. 3, the boom drum 70 is mounted on the inner side (the left side) of the counterweight 3, and is disposed such that the rotational axis thereof is arranged in parallel to the vehicle body back-and-forth direction. The first pulley 71 for the boom is disposed on the tip end of the boom 4. The second pulley 72 for the boom is disposed over the boom drum 70. The wire rope 73 is extended from the boom drum 70 and is wrapped over the first pulley 71 for the boom and the second pulley 72 for the boom. Further, the wire rope 73 is configured to be wound up and paid out in conjunction with rotational driving of the boom drum 70 by a drive unit (not illustrated in the drawings). Accordingly, the boom 4 is configured to be raised and lowered.

Hook Winch 8

The hook winch 8 includes a hook drum 80, a first pulley 81 for the hook, a second pulley 82 for the hook, the wire rope 83 and a restraining part 84.

The wire rope 83 for moving up and down the hook 5 is wound about the hook drum 80. The hook drum 80 is disposed on the rear side of and in alignment with the boom drum 70, while the rotational axis thereof is arranged concentrically to the rotational axis of the boom drum 70 (see an axis S1 in FIG. 3). The axis S1 is arranged in parallel to the vehicle body back-and-forth direction. As illustrated in FIG. 4, the first pulley 81 for the hook is attached to the upper part of the boom 4, and the wire rope 83 coupled to the hook 5 is wrapped over the first pulley 81 for the hook. On the other hand, the second pulley 82 for the hook is disposed on the upper surface of the boom 4 side lateral part of the vehicle main body 2. The wire rope 83 coupled to the hook 5 is extended to the hook drum 80 through the first pulley 81 for the hook and the second pulley 82 for the hook. Further, the wire rope 83 is configured to be wound up and paid out in conjunction with rotational driving of the hook drum 80 by a drive unit (not illustrated in the drawings). Accordingly, the hook 5 is configured to be moved up and down.

Restraining Part 84

As illustrated in FIG. 3, the restraining part 84 is disposed over the hook drum 80, and is configured to restrain the wire rope 83 wound about the hook drum 80 onto the surface of the hook drum 80 by means of the surface of a restraining roller 100.

Figure 5:
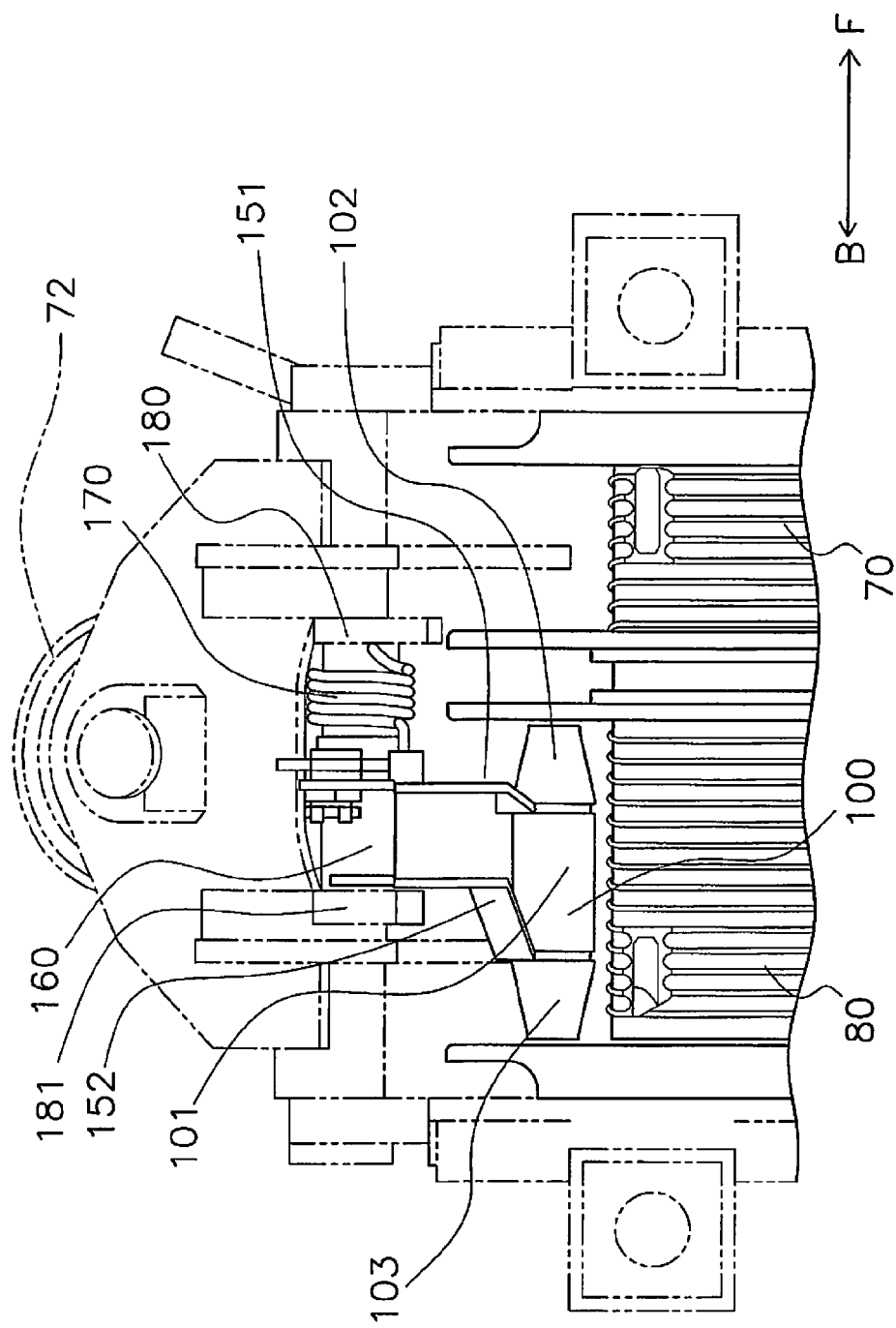
FIG. 5 is a side view of a hook drum, a boom drum and a second pulley for boom seen in the direction of an arrow A depicted in FIG. 4.
Figure 6:
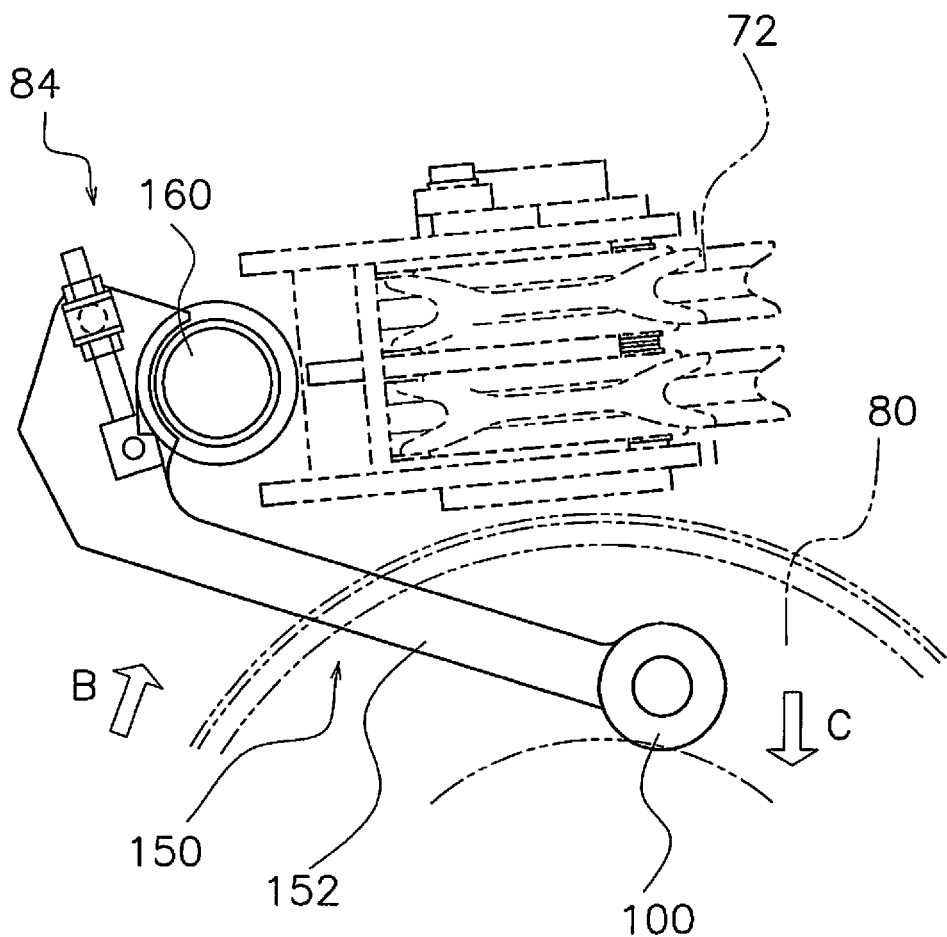
FIG. 6 is a front view of a restraining part and its periphery in FIG. 1.
Figure 7:
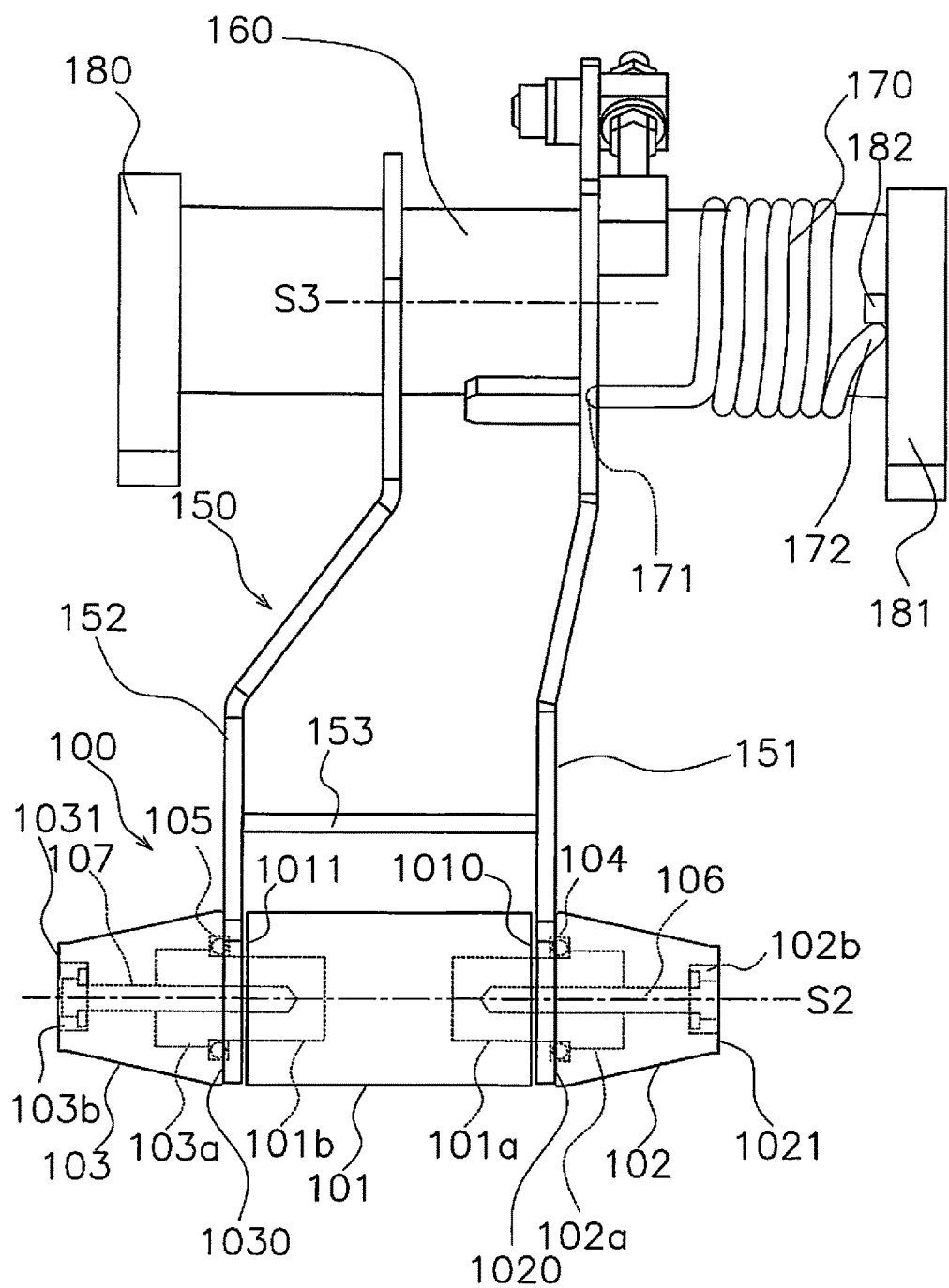
FIG. 7 is a bottom view of the restraining part 84 seen in the direction of an arrow B depicted in FIG. 6.

FIG. 5 is a side view of the hook drum 80, the boom drum 70 and the second pulley 72 for the boom seen from the direction of an arrow A depicted in FIG. 4. It should be noted that in FIG. 5, the second pulley 72 for the boom is depicted with dashed two-dotted lines for convenience of explanation. FIG. 6 is a front view of the restraining part 84 and its periphery. It should be noted that in FIG. 6, the hook drum 80 and the second pulley 72 for the boom are depicted with dashed two-dotted lines for convenience of explanation. FIG. 7 is a bottom view of the restraining part 84 seen from the lower side (in the direction of an arrow B in FIG. 6).

As illustrated in FIGS. 5, 6 and 7, the restraining part 84 includes the restraining roller 100, a support part 150 for supporting the restraining roller 100, a rotational shaft 160 and a torsion spring 170 (see FIGS. 5 and 7) mounted onto the rotational shaft 160.

Restraining Roller 100

The restraining roller 100 is mounted to be rotatable by the support part 150, while its center axis S2 is arranged in parallel to the rotational axis of the hook drum 80 (see the axis S1). In other words, the restraining roller 100 is disposed such that its rotational axis (see the axis S1) is arranged in parallel to the back-and-forth direction of the pipelayer 1 (see FIG. 3).

The restraining roller 100 has a roller middle part 101, a first roller end part 102 and a second roller end part 103.

The roller middle part 101 is formed in a columnar shape. The first roller end part 102 is disposed on a front end 1010 side of the roller middle part 101, and is formed in a roughly circular truncated cone shape tapered such that its radius is reduced to the outside (the front side). The second roller end part 103 is disposed on a rear end 1011 side of the roller middle part 101, and is formed in a roughly circular truncated cone shape tapered such that its radius is reduced to the outside (the rear side).

FIG. 7 illustrates a partial enlarged plan view of the restraining part 84. In FIG. 7, the right side corresponds to the front side of the pipelayer 1, whereas the left side corresponds to the rear side of the pipelayer 1. A coupling portion 101a is formed in the front end of the inside of the roller middle part 101, whereas a coupling portion 101b is formed in the rear end of the inside of the roller middle part 101. Each coupling portion 101a, 101b has a screw hole bored therein along the rotational axis. On the other hand, a coupling portion 102a is formed in the inner end of the inside of the first roller end part 102, whereas a coupling portion 103a is formed in the inner end of the inside of the second roller end part 103. Each coupling portion 102a, 103a has a screw hole bored therein. Further, a bearing 104 is disposed about the coupling portion 102a, whereas a bearing 105 is disposed about the coupling portion 103a.

Although described below in detail, a first support member 151 of the support part 150 is disposed between the roller middle part 101 and the first roller end part 102, whereas a second support member 152 of the support part 150 is disposed between the roller middle part 101 and the second roller end part 103. The bearing 104 is fixed to the first support member 151 and the coupling portion 102a, whereas the bearing 105 is fixed to the second support member 152 and the coupling portion 103a. Further, a screw 106 for coupling the coupling portion 101a and the coupling portion 102a is inserted from the front side of the first roller end part 102 along the rotational axis. On the other hand, a screw 107 for coupling the coupling portion 101b and the coupling portion 103a is inserted from the rear side of the second roller end part 103 along the rotational axis. The roller middle part 101, the first roller end part 102 and the second roller end part 103 are coupled by means of the screws 106 and 107, while being rotatable with respect to the first support member 151 and the second support member 152 by means of the bearings 104 and 105. Further, a recess 102b is formed on the front end side of the first roller end part 102 such that the head of the screw 106 is buried therein, whereas a recess 103b is formed on the rear end side of the second roller end part 103 such that the head of the screw 107 is buried therein.

Support Part 150 and Rotational Shaft 160

Next, the support part 150 will be explained.

As illustrated in FIGS. 6 and 7, the support part 150 includes the first support member 151, the second support member 152 and a reinforcement member 153. The rotational shaft 160 is disposed such that its center axis S3 is arranged in parallel to the center axis S2 of the restraining roller 100. The rotational shaft 160 is rotatably supported at rotational shaft support portions 180 and 181 disposed on the both sides thereof by means of bearings and so forth. The first support member 151 is fixed to the rotational shaft 160, while being coupled at its tip end side to the coupling portion 102a through the bearing 104 as described above. On the other hand, the second support member 152 is fixed to the rotational shaft 160, while being coupled at its tip end side to the coupling portion 103a through the bearing 105 as described above. The interval between the first support member 151 and the second support member 152 is greater on the restraining roller 100 side than on the rotational shaft 160 side. The reinforcement member 153 is mounted between the first support member 151 and the second support member 152 to reinforce the structure between the first support member 151 and the second support member 152.

Torsion Spring 170

As illustrated in FIGS. 5 and 7, the torsion spring 170 is attached onto the rotational shaft 160. One end 171 of the torsion spring 170 contacts the first support member 151 from above. On the other hand, the other end 172 of the torsion spring 170 contacts a protruded portion 182 formed on the rotational shaft support portion 181. The support part 150 is configured to be downwardly rotated about the rotational shaft 160 by fixing the other end 172 in a compressed state of the torsion spring 170 and by causing the one end 171 to make contact with the support member 151 from above. The restraining roller 100 is configured to be urged in the direction of the surface of the hook drum 80 (i.e., the direction of an arrow C depicted in FIG. 6) by means of the rotation.

Hook Drum 80

Figure 8:
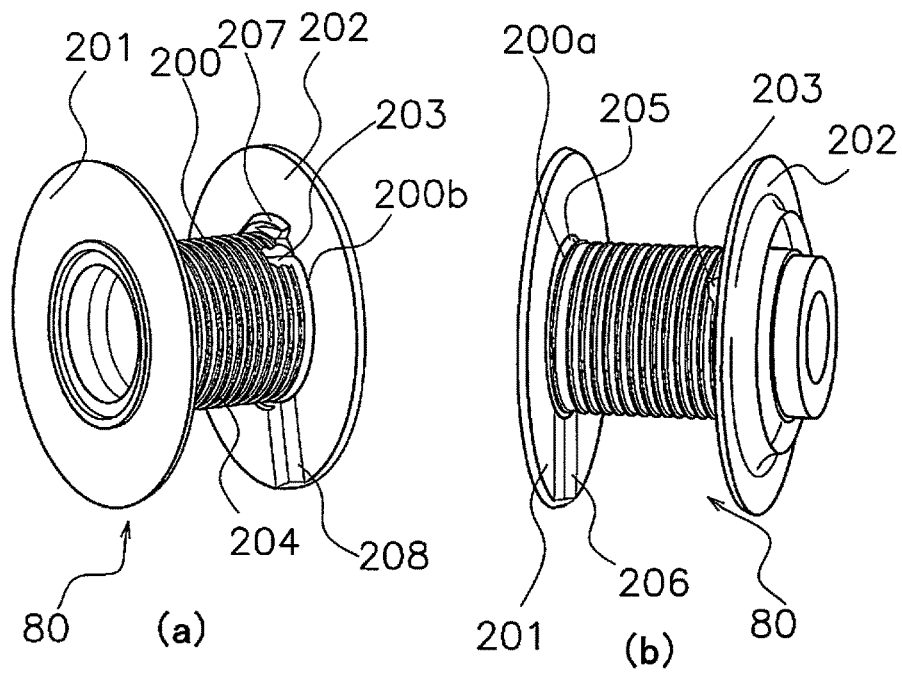
FIG. 8 includes external perspective views (a) to (d) of the hook drum of the pipelayer illustrated in FIG. 1.
Figure 8:
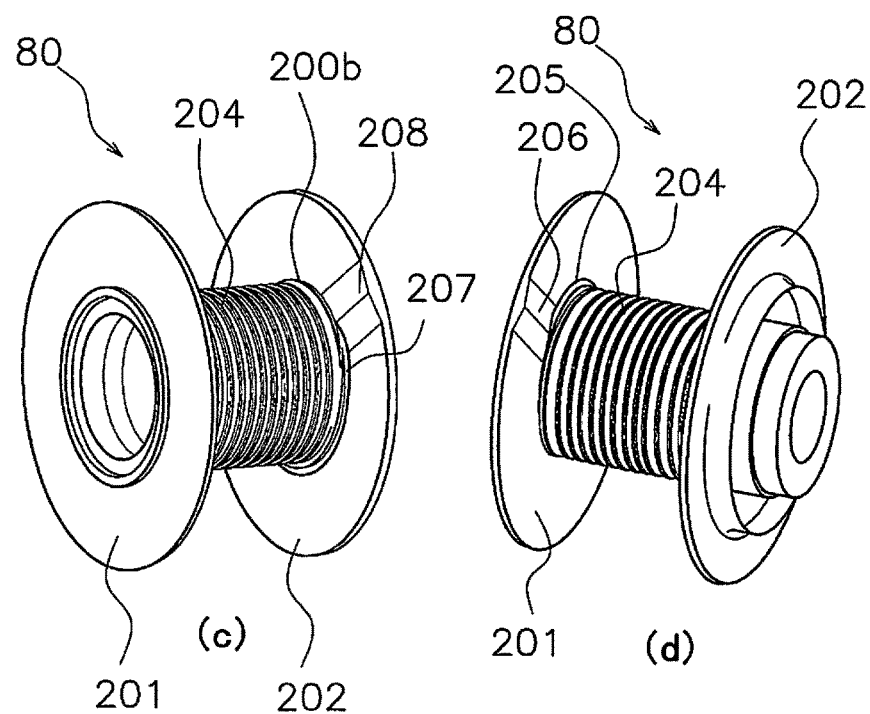

FIG. 8(a) is a perspective view of the hook drum 80 seen from the front left side of the vehicle body. FIG. 8(b) is a perspective view of the hook drum 80 seen from the rear left side of the vehicle body, wherein the hook drum 80 is set in the same state as that of FIG. 8(a). FIG. 8(c) is a perspective view of the hook drum 80 seen in the same direction as that of FIG. 8(a), wherein the hook drum 80 is rotated at an angle of roughly 120 degrees from the state in FIG. 8(a). FIG. 8(d) is a perspective view of the hook drum 80 seen from the rear left side of the vehicle body, wherein the hook drum 80 is set in the same state as that of FIG. 8(c).

As illustrated in FIGS. 8(a) to 8(d), the hook drum 80 includes a columnar drum body 200 and first flange portions 201 and 202 disposed on the both ends of the drum body 200.

The wire rope 83 is wound about the drum body 200. As illustrated in FIG. 8(a), the drum body 200 has a wire rope hole 203 bored in a position on a rear-side end 200b side to fix the wire rope 83 on the inner side of the hook drum 80. The wire rope 83 is inserted into the wire rope hole 203, and is fixed to the hook drum 80 on the inner side of the hook drum 80. It should be noted that a front-side end of the drum body 200, disposed on the opposite side of the end 200b, will be referred to as an end 200a.

The drum body 200 has mount grooves 204 formed on the surface thereof such that, in winding up the wire rope 83, wound portions of the wire rope 83 are aligned side by side.

Figure 9:
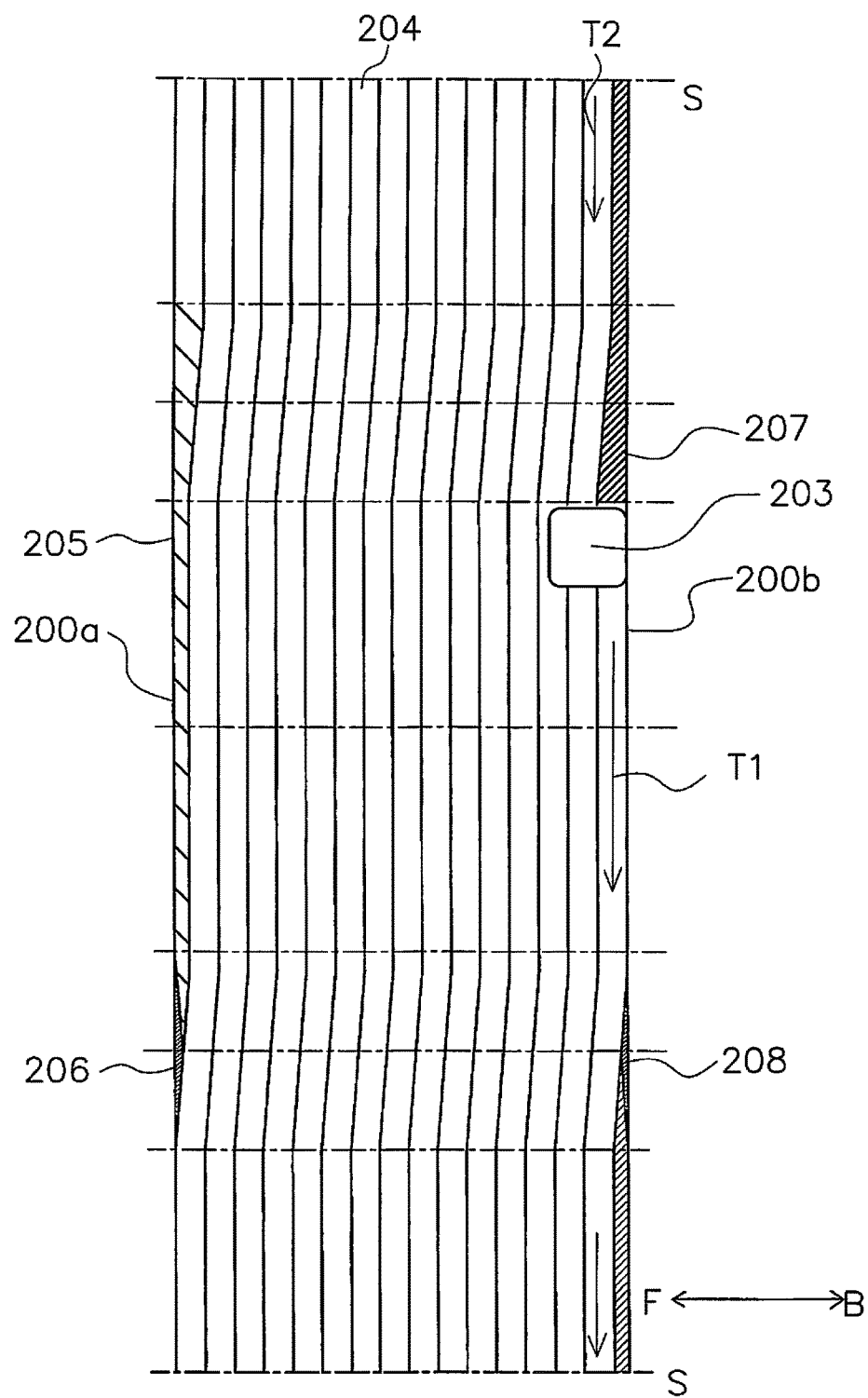
FIG. 9 is a diagram two-dimensionally illustrating the surface of a drum body of the hook drum illustrated in FIG. 8.

FIG. 9 is a diagram two-dimensionally illustrating the surface of the drum body 200. In short, lines S depicted at the top and bottom represent the same position in FIG. 9. As illustrated in FIG. 9, a plurality of mount grooves 204 are obliquely formed along the circumferential direction of the drum body 200. When being wound up, the wire rope 83 is wound up from the wire rope hole 203 along an arrow T1 while being fitted into the groove 204. When reaching the bottom end in FIG. 9, the wire rope 83 is then wound up from the top end in FIG. 9 along an arrow T2 while being fitted into the mount groove 204. Thus, with the structure that the plural mount grooves 204 are obliquely formed with respect to the circumferential direction, the wire rope 83 is configured to be moved from the end 200a towards the end 200b in accordance with the winding-up thereof.

Further, as illustrated in FIGS. 8(b) and 8(d) and FIG. 9, a first convex portion 205 is formed on the first flange portion 201 along the surface of the drum body 200. Further, a first kicker portion 206 is formed on the inner lateral surface of the first flange portion 201, while being formed in a strap shape along the radial direction so as to be protruded inwards. The first kicker portion 206 is formed in a roughly triangular prism shape such that the width-directional middle part thereof is most inwardly protruded. As illustrated in FIGS. 8(a) and 8(c) and FIG. 9, a second convex portion 207 is formed on the second flange portion 202 along the surface of the drum body 200. Further, a second kicker portion 208 is formed on the inner lateral surface of the second flange portion 202, while being formed in a strap shape along the radial direction so as to be protruded inwards. The second kicker portion 208 is formed in a roughly triangular prism shape such that the width-directional middle part thereof is most inwardly protruded. The first convex portion 205, the first kicker portion 206, the second convex portion 207 and the second kicker portion 208 will be described in detail in explaining the action of winding up the wire rope.

It should be noted that the drum body 200 is formed such that the width thereof has roughly the same length as that of the restraining roller 100. Actually, the restraining roller 100 is required to be inserted between the first flange portions 201 and 202. Therefore, the drum body 200 is formed such that the width thereof is slightly greater than that of the restraining roller 100.

Fleet Angle and Taper Angle

Figure 10:
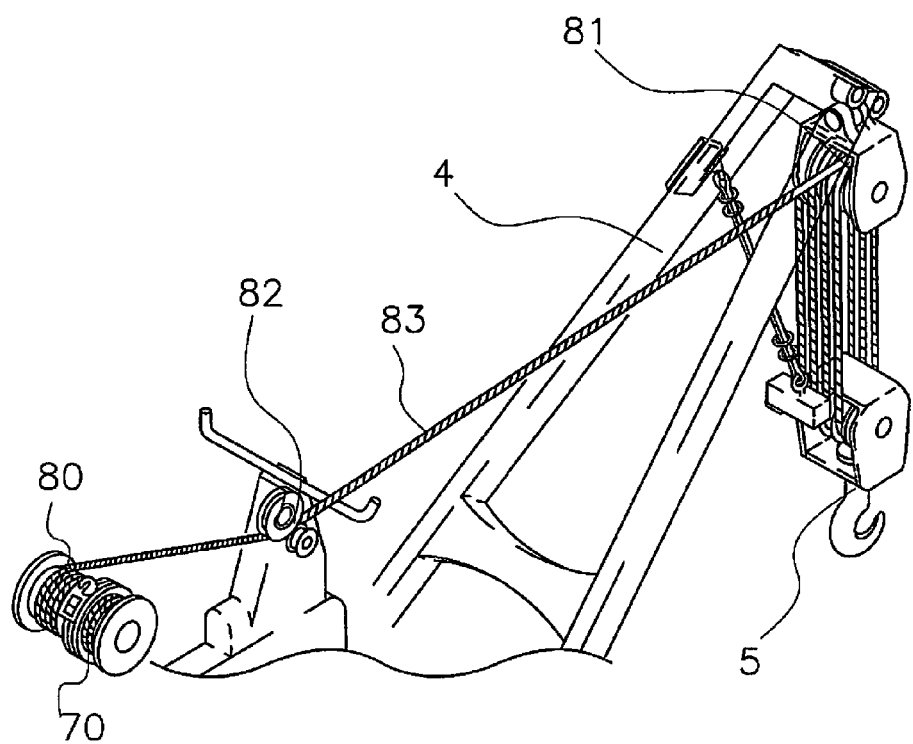
FIG. 10 is a perspective view of a hook winch of the pipelayer illustrated in FIG. 1.
Figure 11:
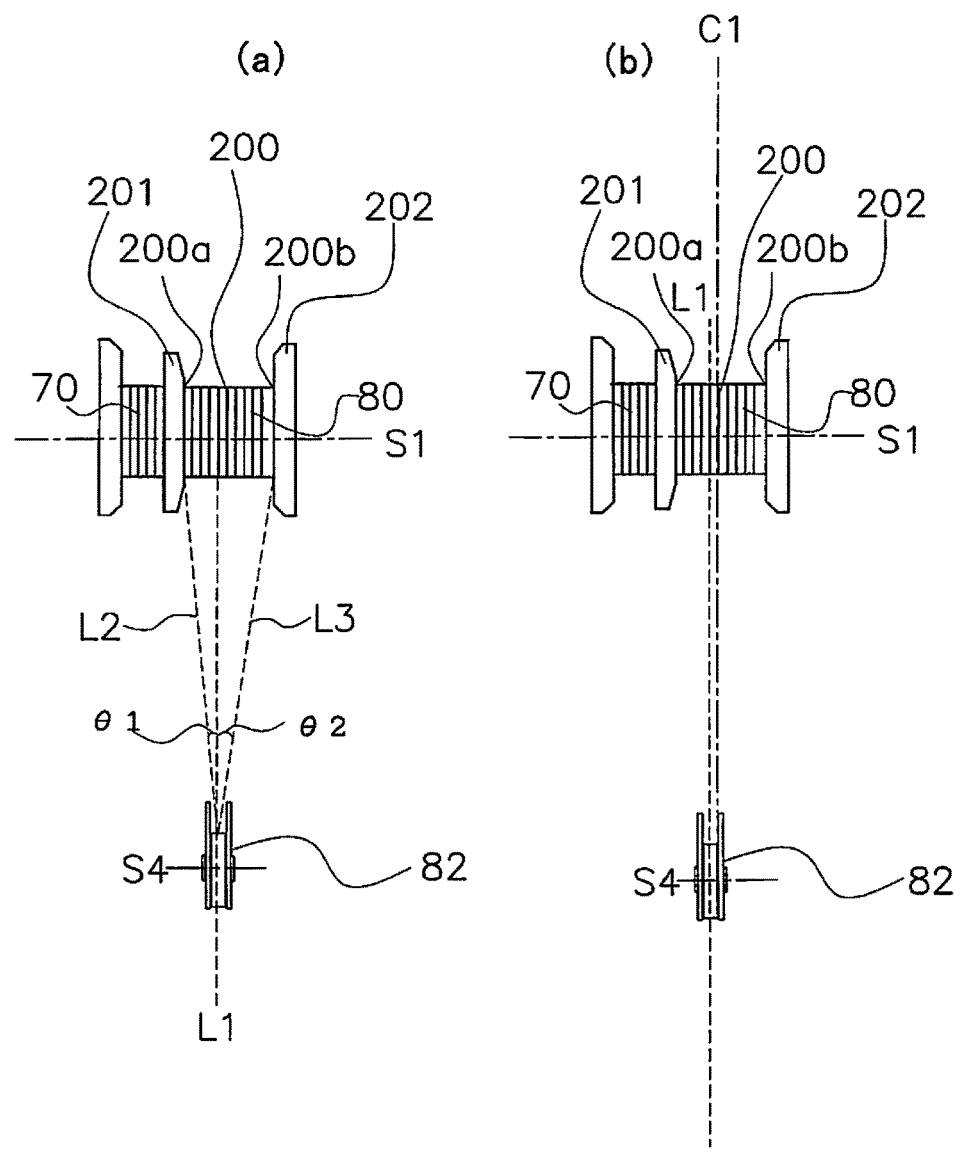
FIG. 11 includes plan views (a) and (b) illustrating positional relations between the hook drum and a second pulley for hook in the pipelayer illustrated in FIG. 1.

Next, explanation will be made for the fleet angle of the hook drum 80 of the present exemplary embodiment. FIG. 10 is a perspective view of the structure of the hook winch 8. FIGS. 11(a) and 11(b) are schematic plan views of FIG. 10. As illustrated in FIG. 11(a), the fleet angle is defined as an angle formed between a line L1 extended perpendicularly from the second pulley 82 for the hook to the rotational axis S1 of the hook drum 80 and a line L2, L3 connecting the second pulley 82 for the hook and the inner side of the flange portion 201, 202 of the hook drum 80. The front-side fleet angle formed between the line L1 and the line L2 is set to be θ1, whereas the rear-side fleet angle formed between the line L1 and the line L3 is set to be θ2.

In the present exemplary embodiment, the second pulley 82 for the hook is herein disposed such that its position relative to the hook drum 80 in the width direction is shifted towards the boom drum 70. When described in detail, as illustrated in FIG. 11(b), the line L1 extended perpendicularly from the second pulley 82 for the hook to the rotational axis S1 of the hook drum 80 is disposed on the boom drum 70 side (front side) of a middle line C1 of the hook drum 80 in the width direction. Therefore, the front-side fleet angle θ1 is set to be less than the rear-side fleet angle θ2.

Figure 12:
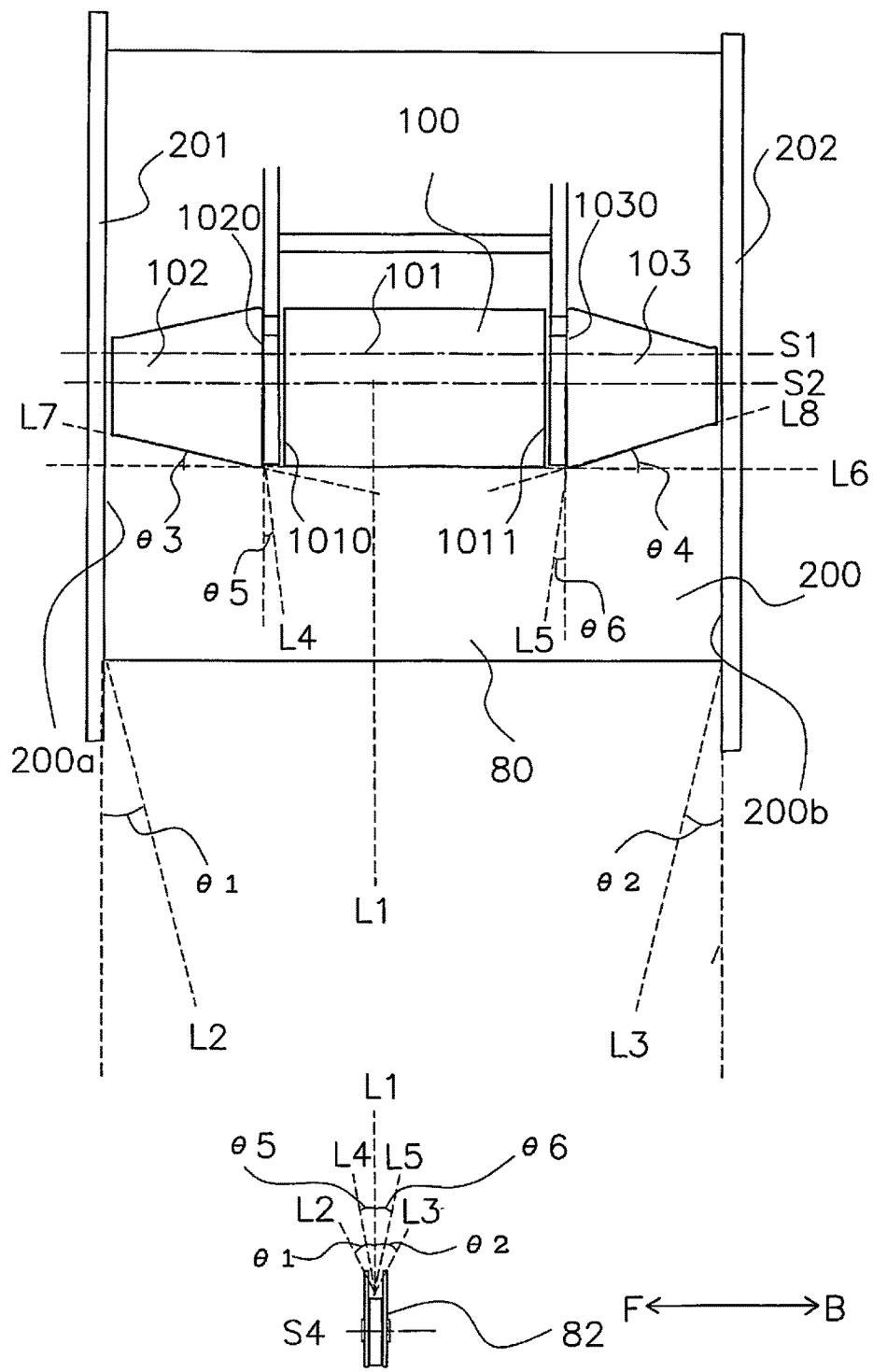
FIG. 12 is a diagram for explaining a taper angle of a restraining roller of the pipelayer illustrated in FIG. 1.

FIG. 12 is a diagram for explaining the taper angle of the restraining roller 100. FIG. 12 illustrates the restraining roller 100 and the hook drum 80. As illustrated in FIG. 12, where in a plan view seen in a direction perpendicular to the center axis S2 (also referred to as the rotational axis) of the restraining roller 100, a line arranged in parallel to the surface of the roller middle part 101 is set as a line L6; a line arranged in parallel to the surface of the first roller end part 102 is set as a line L7; a line arranged in parallel to the surface of the second roller end part 103 is set as a line L8, an angle θ3 formed between the line L6 and the line L7 is set as the taper angle of the first roller end part 102 whereas an angle θ4 formed between the line L6 and the line L8 is set as the taper angle of the second roller end part 103.

The taper angle θ3 is formed to be less than the taper angle θ4. This is because the fleet angle θ1 formed at the end 200a of the hook drum 80 on the first-roller-end-part 102 side is less than the fleet angle θ2 formed at the end 200b of the hook drum 80 on the second-roller-end-part 103 side. In other words, the taper angle is formed to have a greater angle when being formed on a greater fleet angle side.

Although the following content will be also described in explaining a wire rope winding-up action, when the fleet angle formed at an end is increased, chances are that uneven winding is caused due to increase in thrust force to be generated in the wire rope when the wire rope is turned back at the end, and thereby, the wire rope cannot be orderly wound up. To suppress occurrence of uneven winding, such as slippage of the wire rope, the end parts of the restraining roller 100 are formed in the aforementioned taper shapes. The fleet angle θ1 can be set to be, for instance, 3 degrees; the fleet angle θ2 can be set to be, for instance, 4.5 degrees; the taper angle θ3 can be set to be, for instance, 6 degrees; and the taper angle θ4 can be set to be, for instance, 12 degrees.

Further, as illustrated in FIG. 12, an angle θ5 is less than or equal to 4 degrees, that is formed between: a line L4 connecting the second pulley 82 for hook and a position on the surface of the hook drum 80 in opposition to an inner end 1020 of the first roller end part 102; and the perpendicular line L1 extended from the second pulley 82 for hook to the rotational axis S1 of the hook drum 80. Yet further, as illustrated in FIG. 12, an angle 96 is less than or equal to 4 degrees, that is formed between: a line L5 connecting the second pulley 82 for hook and a position on the surface of the hook drum 80 in opposition to an inner end 1030 of the second roller end part 103; and the perpendicular line L1 extended from the second pulley 82 for hook to the rotational axis S1 of the hook drum 80.

In short, when the mount grooves 204 are formed on the surface of the drum body 200, occurrence of uneven winding attributed to the thrust force can be suppressed, as shown in the present exemplary embodiment, by forming a taper shape on a restraining-roller 100 part opposed to a drum-surface part that an angle of greater than 4 degrees is formed between: the line connecting a position on the surface of the hook drum 80 and the second pulley 82 for hook; and the perpendicular line L1 extended from the second pulley 82 for the hook to the rotational axis S1 of the hook drum 80.

Further, the fleet angle on the boom drum 70 will be explained.

As described above, the fleet angle on the hook drum 80 is determined by a distance d1 (see FIG. 4) between the second pulley 82 for hook and the hook drum 80 and the position of the second pulley 82 for the hook along the rotational axis of the hook drum 80. On the other hand, the fleet angle on the boom drum 70 is determined by a distance d2 (see FIG. 4) between the first pulley 71 for the boom and the boom drum 70 and the position of the first pulley 71 for the boom along the rotational axis of the hook drum 80. However, the distance d2 is much greater than the distance d1. Therefore, the front-side fleet angle and the rear-side fleet angle are small angles. Due to this, uneven winding is not caused on the boom drum 70 when the wire rope is turned back at a drum end. Hence, unlike the hook drum 80, it is not required to provide the restraining roller 100 having the taper shapes.

Wire Rope Winding-Up Action

Next, an action of winding up the wire rope will be explained.

Seen from front (e.g., FIG. 2), the wire rope 83 is gradually wound up by rotating the hook drum 80 in the counterclockwise direction.

Figure 13:
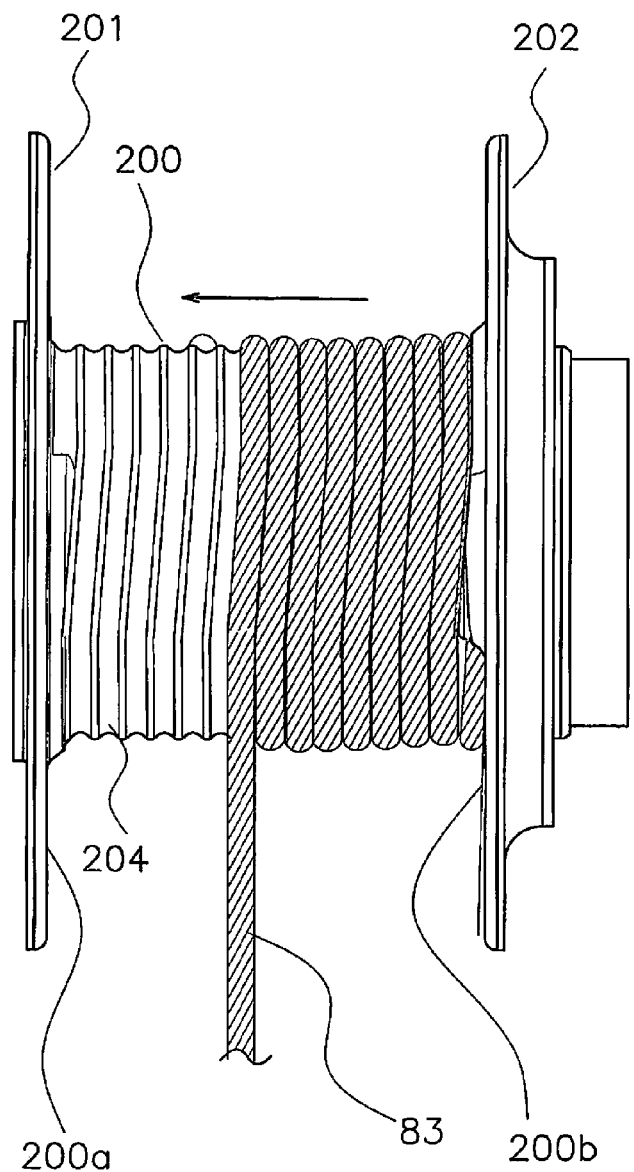
FIG. 13 is a diagram illustrating a condition that a wire rope is being wound about the hook drum of the pipelayer illustrated in FIG. 1.
Figure 14:
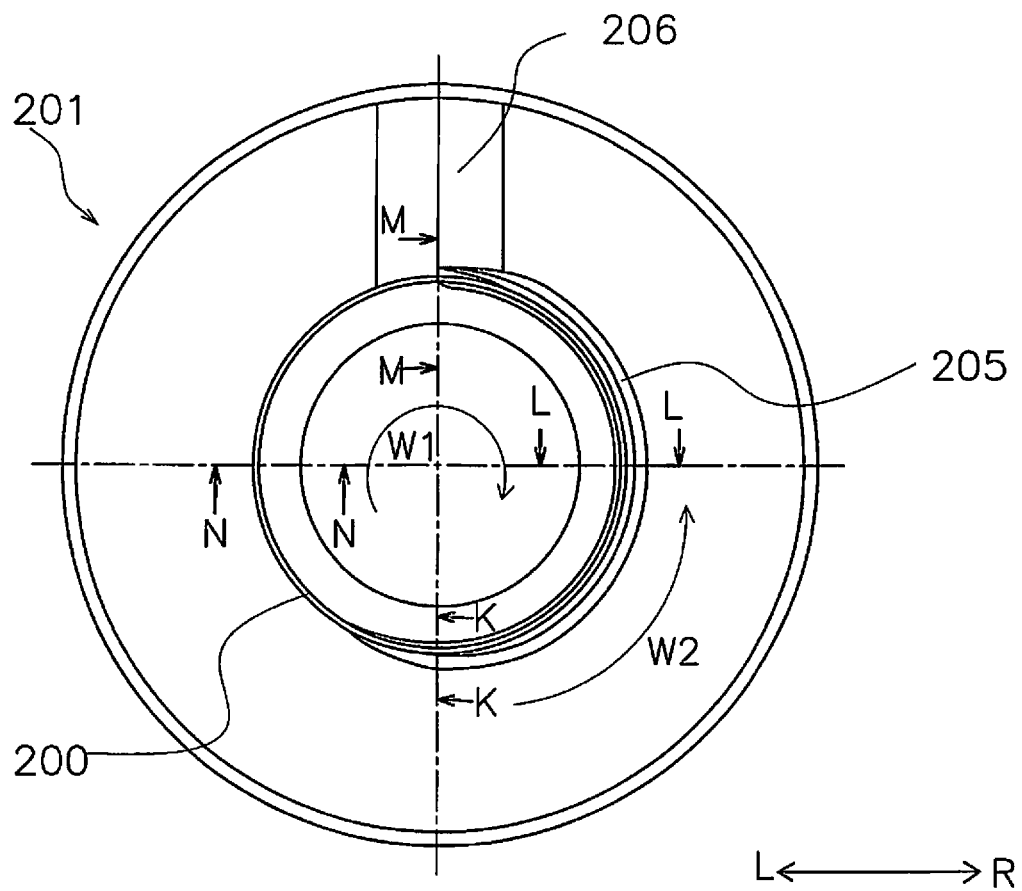
FIG. 14 is a plan view of a first-flange-portion side inner lateral surface of the hook drum of the pipelayer illustrated in FIG. 1.
Figure 15:
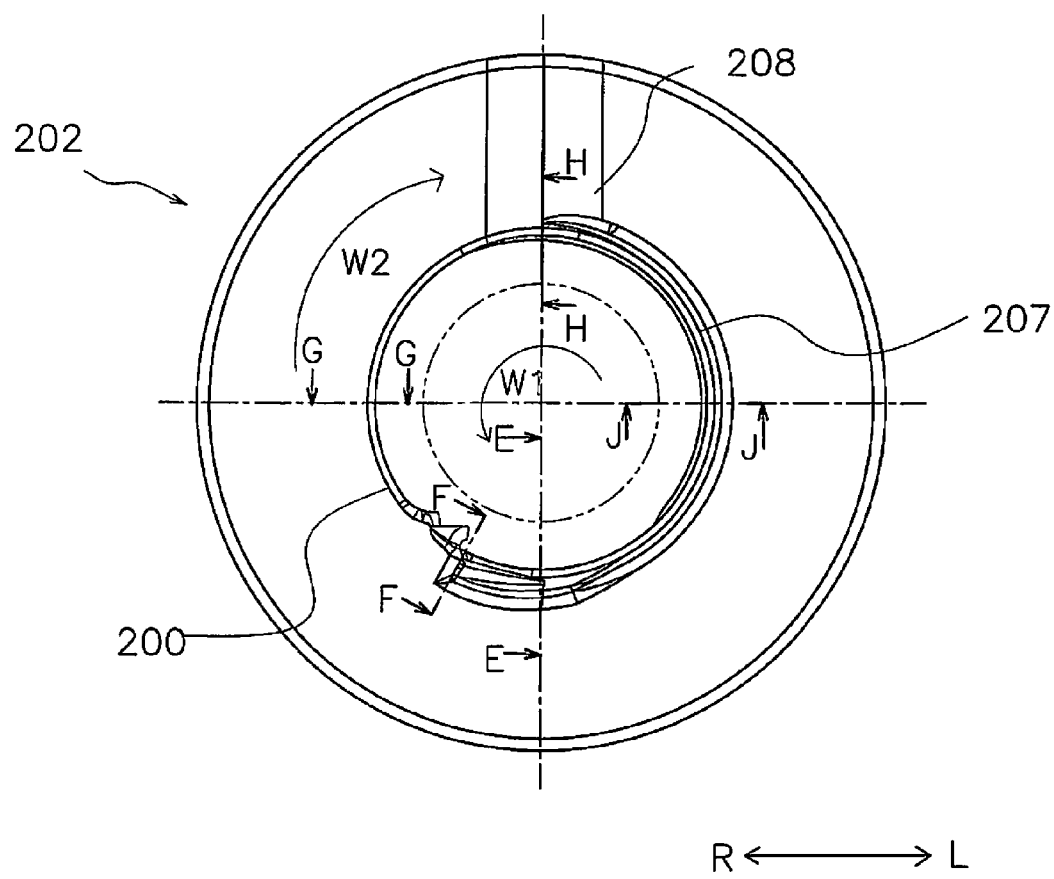
FIG. 15 is a plan view of a second-flange-portion side inner lateral surface of the hook drum of the pipelayer illustrated in FIG. 1.

FIG. 13 is a diagram of the surface of the hook drum 80. As illustrated in FIG. 13, the wire rope 83 is wound about the drum body 200 along the mount grooves 204 from the rear-side end 200b towards the front-side end 200a. FIG. 14 is a plan view of the inner side of the first flange portion 201 seen from rear. FIG. 15 is a plan view of the inner side of the second flange portion 202 seen from front. It should be noted that FIGS. 14 and 15 illustrate the same condition. In other words, the first kicker portion 206 is disposed on the upper side in FIG. 14, whereas the second kicker portion 208 is also disposed on the upper side as illustrated in FIG. 15. Thus, the first kicker portion 206 and the second kicker portion 208 are disposed in opposition to each other.

When being wound about along the mount grooves 24 from the rear-side end 200b towards the front-side end 200a and reaching the front-side end 200a, the wire rope 83 is gradually wound up on a layer formed by the wound portions thereof. It should be noted that in FIGS. 14 and 15, the rotational direction of the hook drum 80 in winding up the wire rope 83 is indicated with W1, whereas the direction of disposing the wire rope 83 on the drum surface is indicated with W2.

FIGS. 16(a) to 16(d) are diagrams illustrating the vicinity of the end 200a. FIG. 16(a) is a diagram illustrating a condition that the hook drum 80 is rotated such that a part KK depicted in FIG. 14 comes to the position that the restraining roller 100 is disposed. FIG. 16(b) is a diagram illustrating a condition that the hook drum 80 is rotated at an angle of roughly 90 degrees from the condition illustrated in FIG. 16(a) such that a part LL depicted in FIG. 14 comes to the position that the restraining roller 100 is disposed. FIG. 16(c) is a diagram illustrating a condition that the hook drum 80 is rotated at an angle of roughly 90 degrees from the condition illustrated in FIG. 16(b) such that a part MM depicted in FIG. 14 comes to the position that the restraining roller 100 is disposed. FIG. 16(d) is a diagram illustrating a condition that the hook drum 80 is rotated at an angle of roughly 90 degrees from the condition illustrated in FIG. 16(c) such that a part NN depicted in FIG. 14 comes to the position that the restraining roller 100 is disposed.

Explanation will be made for a behavior to be performed when the wire rope 83 is turned back from the first layer to the second layer at the end 200a.

As illustrated in FIG. 13, the wire rope 83 forms the first layer thereof on the surface of the drum body 200 by moving from the end 200b to the end 200a on the drum body 200.

Further, as illustrated in FIG. 16(a), a groove 205a is formed on the upper side of the first convex portion 205 formed on the end 200a, and the wire rope 83 is disposed in the groove 205a when reaching the end 200a. A portion of the wire rope 83 disposed in the groove 205a is indicated with 83b, whereas another portion of the wire rope 83 located on the rear side of the portion 83b is indicated with 83a.

When the wire rope 83 is further wound up, the position of the wire rope portion 83b gets higher as illustrated in FIG. 16(b). This is because the first convex portion 205 is formed such that the height thereof is increased along the circumferential direction of the hook drum 80.

When the wire rope 83 is subsequently wound up, as illustrated in FIG. 16(c), the wire rope portion 83b passes through the first kicker portion 206 illustrated in FIG. 14. The first kicker portion 206 is protruded inward. Hence, the first kicker portion 206 makes contact with the wire rope 83 and a force is applied inwardly (in a thrust direction and an arrow X1 direction) to the wire rope portion 83b. Together with the thrust force applied by the first kicker portion 206, an inward (thrust directional) force, generated in the wire rope 83 due to the fleet angle, is generated in the wire rope portion 83b.

On the other hand, the wire rope portion 83b is restrained by the first roller end part 102 from above. Where the restraining force is defined as F, as illustrated in FIG. 16(e), the restraining force F is divided into a thrust resistive force F1 and a downward force F2. The aforementioned two thrust forces are greater than the thrust resistive force F1. Hence, the wire rope portion 83b located at the drum end is moved to a wire rope groove 83d that is formed by the wire rope portion 83a and a wire rope portion 83c located inwardly of the wire rope portion 83a on the upper side of these wire rope portions. It should be noted that the wire rope groove 83d refers to a groove to be formed by the surfaces of the adjacent portions of the wire rope 83 on the upper side of these adjacent wire rope portions.

In this moving, the thrust resistive force F1 generated by the taper shape makes it possible to suppress occurrence of a situation that the wire rope is inwardly moved too much by means of the thrust directional (X1) force and thereby a clearance is produced between adjacent wire rope portions.

Further, by appropriately setting the taper angle, it is possible to suppress occurrence of a situation that the thrust resistive force F1 becomes extremely greater and thereby the wire rope 83 is repeatedly wound about at the end 200a while being retained at the end 200a.

By thus adjusting the taper angle such that the thrust resistive force F1 is set to have an appropriate value, the wire rope portion 83b can be moved across the wire rope portion 83a located on the outermost end of the lower layer of the wire rope 83 and be located in the wire rope groove 83d.

It should be noted that the wire rope 83 can be also easily moved in the thrust direction when a space is produced on the arrow-X1 side (the inner side) of the wire rope portion 83b such that the wire rope portion 83b can be moved thereto as illustrated in FIG. 16(c). However, in the present exemplary embodiment, the taper shape restricts moving of the wire rope portion 83b in the thrust direction (X1 direction). Therefore, even in this case, the wire rope portion 83b can be inhibited from being moved across the wire rope groove 83d to a further inward wire rope groove.

When being wound up subsequently, the wire rope 83 is gradually disposed along the wire rope groove 83d, and is moved from the end 200a to the end 200b. Thus, the second layer of the wire rope 83 is gradually formed.

It should be noted that, on the middle part of the hook drum 80, i.e., a part of the hook drum 80 corresponding to the roller middle part 101 of the restraining roller 100, a small angle is formed between the line connecting the wire rope 83 and the second pulley 82 for hook and the perpendicular line extended from the second pulley 82 for hook to the rotational axis S1 of the hook drum 80. Hence, a small force is applied to the wire rope 83 in the thrust direction. Therefore, the wire rope 83 can be orderly wound up even without forming a taper shape on the roller middle part 101.

Explanation will be made for a behavior to be performed when the wire rope 83 is turned back from the second layer to the third layer at the end 200(b).

FIGS. 17(a) to 17(e) are diagrams illustrating the vicinity of the end 200b. FIG. 17(a) is a diagram illustrating a condition that the hook drum 80 is rotated such that a part EE depicted in FIG. 15 comes to the position that the restraining roller 100 is disposed. FIG. 17(b) is a diagram illustrating a condition that the hook drum 80 is rotated at an angle of roughly 30 degrees from the condition illustrated in FIG. 17(a) such that a part FF depicted in FIG. 15 comes to the position that the restraining roller 100 is disposed. FIG. 17(c) is a diagram illustrating a condition that the hook drum 80 is rotated at an angle of 90 degrees from the condition illustrated in FIG. 17(a) such that a part GG depicted in FIG. 15 comes to the position that the restraining roller 100 is disposed. FIG. 17(d) is a diagram illustrating a condition that the hook drum 80 is further rotated at an angle of 90 degrees from the condition illustrated in FIG. 17(c) such that a part HH depicted in FIG. 15 comes to the position that the restraining roller 100 is disposed. FIG. 17(e) is a diagram illustrating a condition that the hook drum 80 is further rotated at an angle of 90 degrees from the condition illustrated in FIG. 17(d) such that a part JJ depicted in FIG. 15 comes to the position that the restraining roller 100 is disposed.

As illustrated in FIG. 17(a), a groove 207a is formed on the upper side of the second convex portion 207 formed on the end 200b, and the wire rope 83 is disposed in the groove 207a when reaching the end 200b. A portion of the wire rope 83 disposed in the groove 207a is indicated with 83e, whereas another portion of the wire rope 83 located on the front side of the wire rope portion 83e on the second layer is indicated with 83f.

When the wire rope 83 is further wound up, the position of the wire rope portion 83e gets higher as illustrated in FIG. 17(b). This is because the second convex portion 207 is formed such that the height thereof is increased along the circumferential direction of the hook drum 80. The wire rope portion 83e is substantially moved from the second layer to the third layer, and is located in the vicinity of the end 200b. The fleet angle is roughly maximized at this position. Hence, the thrust force is roughly maximized that tries to pull the wire rope portion 83e to the middle of the drum 80 in the axial direction. The thrust force is received by the second roller end part 103 of the restraining roller 100, and thereby, the wire rope portion 83e is never moved towards the middle of the hook drum 80.

When the wire rope 83 is further wound up, the groove 207a is no longer formed as illustrated in FIG. 17(c). The wire rope portion 83e gets closest to the end 200b, while the fleet angle is maximized. The wire rope portion 83e and the second roller end part 103 make contact with each other. Hence, moving of the wire rope portion 83e is not caused by means of the thrust force. A necessary condition that the wire rope portion 83e and the second roller end part 103 make contact with each other at this position is that a difference in radius between the minimum-diameter outer end and the maximum-diameter inner end of the second roller end part 103 is less than the diameter of the wire rope 83. This will be explained below in detail.

When the wire rope 83 is wound up subsequently, as illustrated in FIG. 17(d), the wire rope portion 83e passes through the vicinity of the second kicker portion 208 illustrated in FIG. 15. The second kicker portion 208 is protruded inwardly. Hence, the second kicker portion 208 makes contact with the wire rope 83 in accordance with winding-up of the wire rope 83, and a force is applied inwardly (in a thrust direction and an arrow X2 direction) to the wire rope portion 83e that has reached the third layer. Here, a drum inward (thrust directional) force, generated in the wire rope 83, is also generated based on the fleet angle.

When the sum of the two thrust directional forces exceeds the thrust resistive force (see F1 in FIG. 16) attributed to the taper shape of the second roller end part 103, the wire rope portion 83e pushes up the restraining roller 100 and is moved to a wire rope groove 83h that is formed by the wire rope portion 83f and a wire rope portion 83g located inwardly of the wire rope portion 83f on the upper side of these wire rope portions.

FIG. 17(e) is a diagram illustrating a condition that the wire rope portion 83e passes through the second kicker portion 208 and is moved to the wire rope groove 83h. The wire rope portion 83e receives the thrust force that tries to pull the wire rope portion 83e to the middle of the hook drum 80 in the axial direction. However, the wire rope portion 83e contacts the second roller end part 103. Hence, the wire rope portion 83e is never moved towards the middle of the hook drum 80 across the wire rope groove 83h.

The wire rope portion 83e, which is the tip end portion of the wire rope 83 wound about the hook drum 80, constantly receives the thrust force that tries to pull the wire rope portion 83e towards the middle of the hook drum 80 when being moved from the second layer to the third layer of winding. Meanwhile, the wire rope portion 83e makes contact with the restraining roller 100, and the thrust resistive force generated by the taper shape makes it possible to suppress occurrence of a situation that the wire rope portion 83e is inwardly moved too much and thereby uneven winding is caused. Further, by appropriately setting the taper angle, it is possible to suppress occurrence of a situation that the thrust resistive force F1 becomes extremely greater and thereby the wire rope 83 is repeatedly wound about at the end 200b while being retained at the end 200b.

The fleet angle formed at the end 200b becomes greater than that formed at the end 200a, and thereby, the thrust directional force becomes greater. Therefore, by setting the taper angle at the second roller end part 103 to be greater than that set at the first roller end part 102, it is possible to suppress occurrence of a situation that the wire rope 83 is inwardly moved too much when being turned back at the end 200b.

As described above, by forming the taper shapes with appropriate angles on the both ends of the restraining roller 100 for restraining the wire rope 83 wound about the hook drum 80 onto the surface of the hook drum 80, the wire rope can be appropriately moved when being inwardly turned back at the both ends. Hence, it is possible to suppress occurrence of uneven winding of the wire rope at the ends.

After the condition of FIG. 17(e), the third layer is formed from the end 200b towards the end 200a, and the wire rope 83 is further turned back at the end 200a. Then, the fourth layer is formed from the end 200a towards the end 200b, and the wire rope 83 is turned back to the end 200a side (also referred to as the inward) at the end 200b. The fifth layer is thus formed, and winding of the wire rope is completed as illustrated in FIG. 18.

Figure 16:
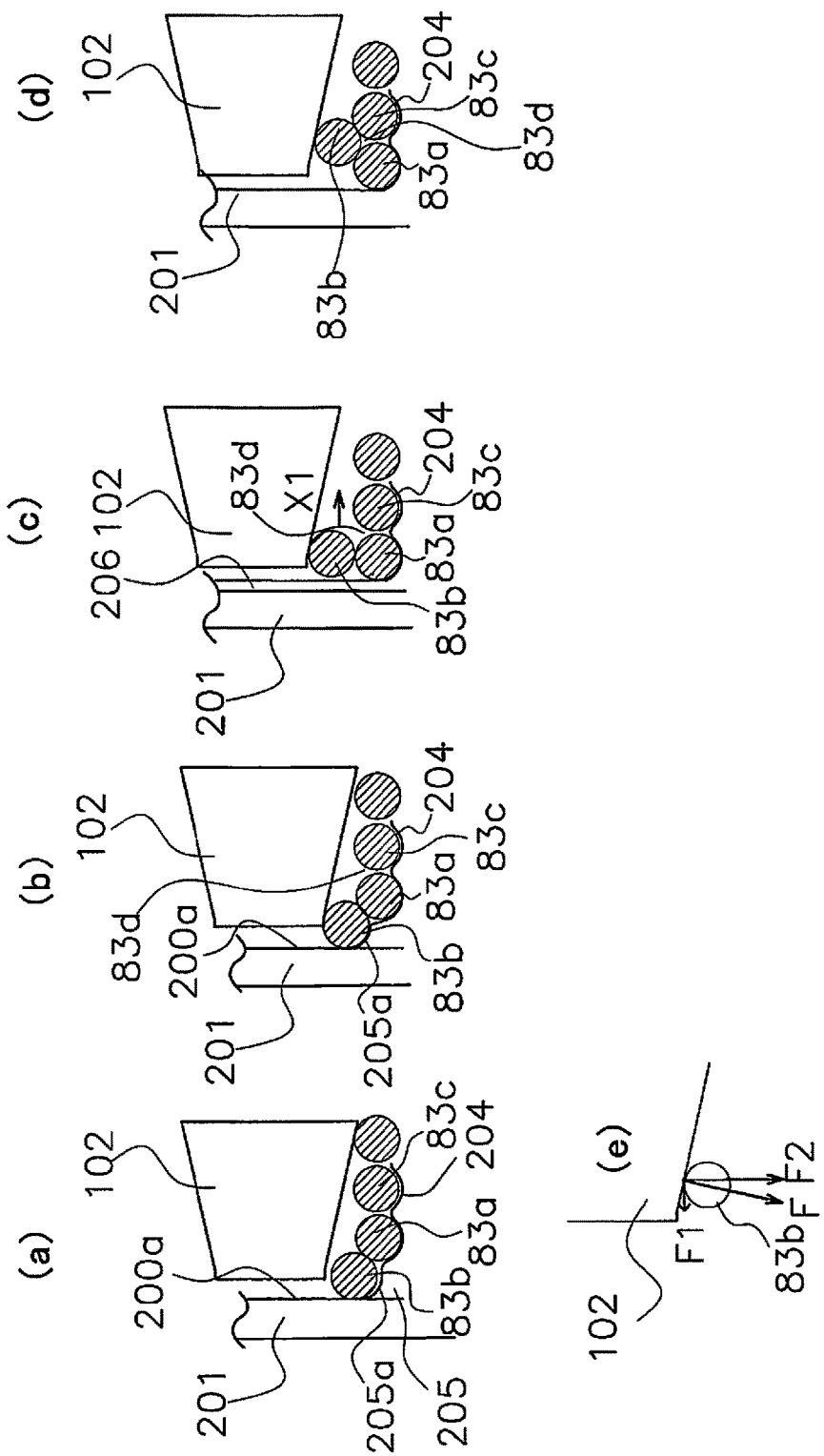
FIG. 16 includes diagrams (a) to (e) for explaining conditions that the wire rope is being wound about the hook drum of the pipelayer illustrated in FIG. 1.
Figure 17:
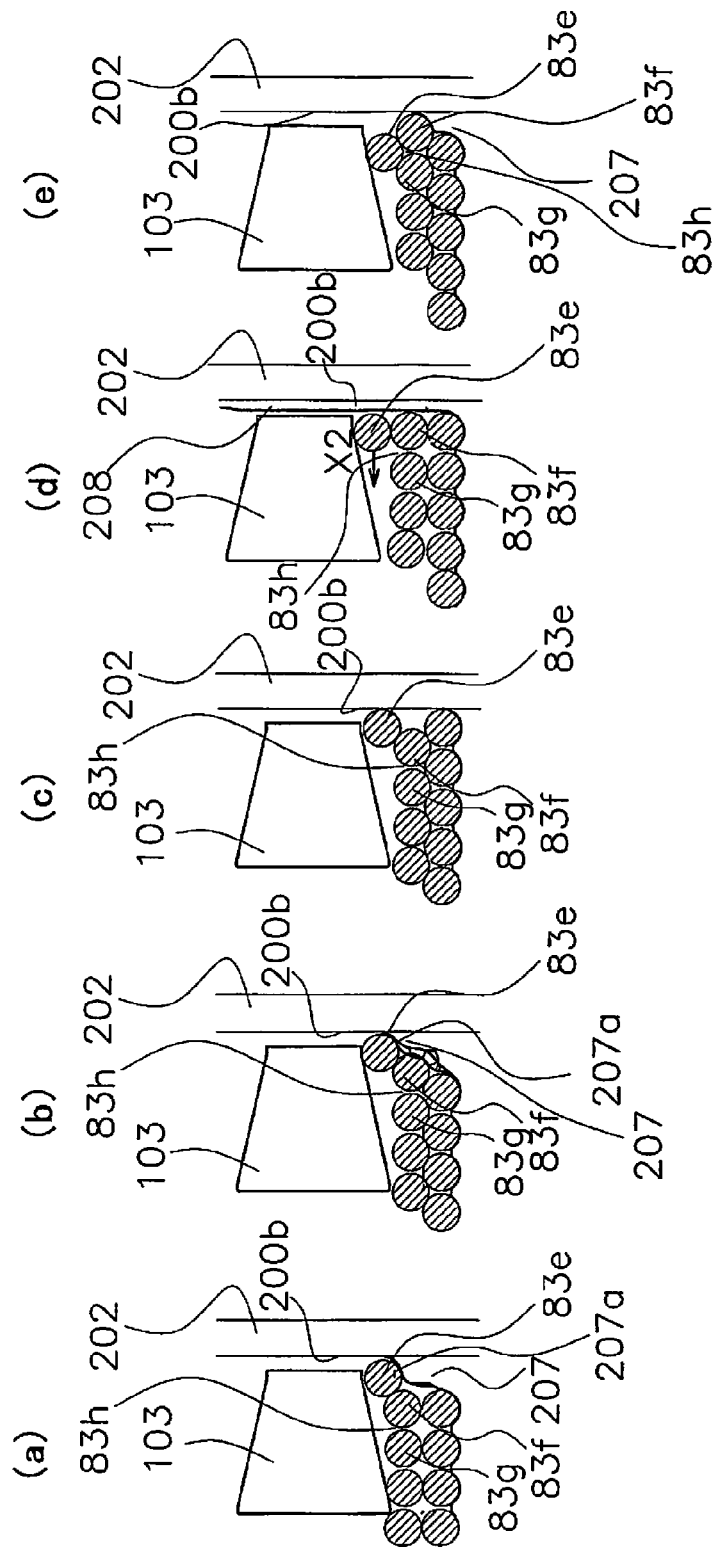
FIG. 17 includes diagrams (a) to (e) for explaining conditions that the wire rope is being wound about the hook drum of the pipelayer illustrated in FIG. 1.
Figure 18:
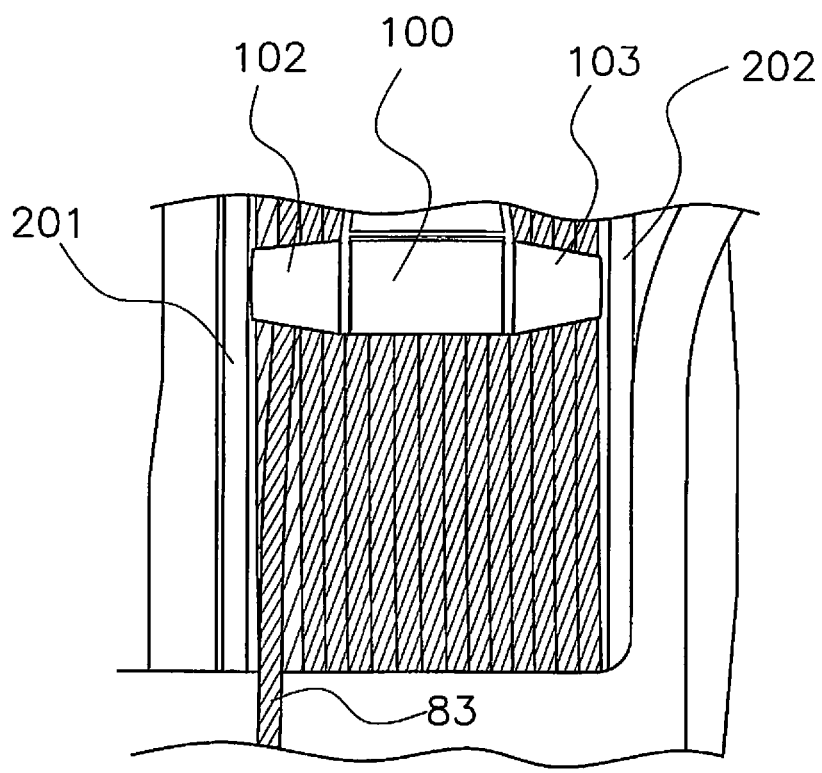
FIG. 18 is a diagram illustrating a condition that the wire rope has been wound about the hook drum of the pipelayer illustrated in FIG. 1.

It should be noted that, similarly when being turned back from the third layer to the fourth layer at the end 200a and when being turned back from the fourth layer to the fifth layer at the end 200b, the wire rope 83 traces the moving path similar to those illustrated in FIGS. 16 and 17 while being guided by the upper surfaces of the wound portions of the wire rope 83 in the third layer or the fourth layer.

Further, explanation will be hereinafter made for a relation of the taper shape with the diameter of the wire rope.

The width of the first roller end part 102 and that of the second roller end part 103 are greater than the diameter of the wire rope 83. Further, a difference in diameter between the inner end 1020 of the first roller end part 102 and an outer end 1021 of the first roller end part 102 is less than the diameter of the wire rope 83, whereas a difference in diameter between the inner end 1030 of the second roller end part 103 and an outer end 1031 of the second roller end part 103 is less than the diameter of the wire rope 83.

Figure 19:
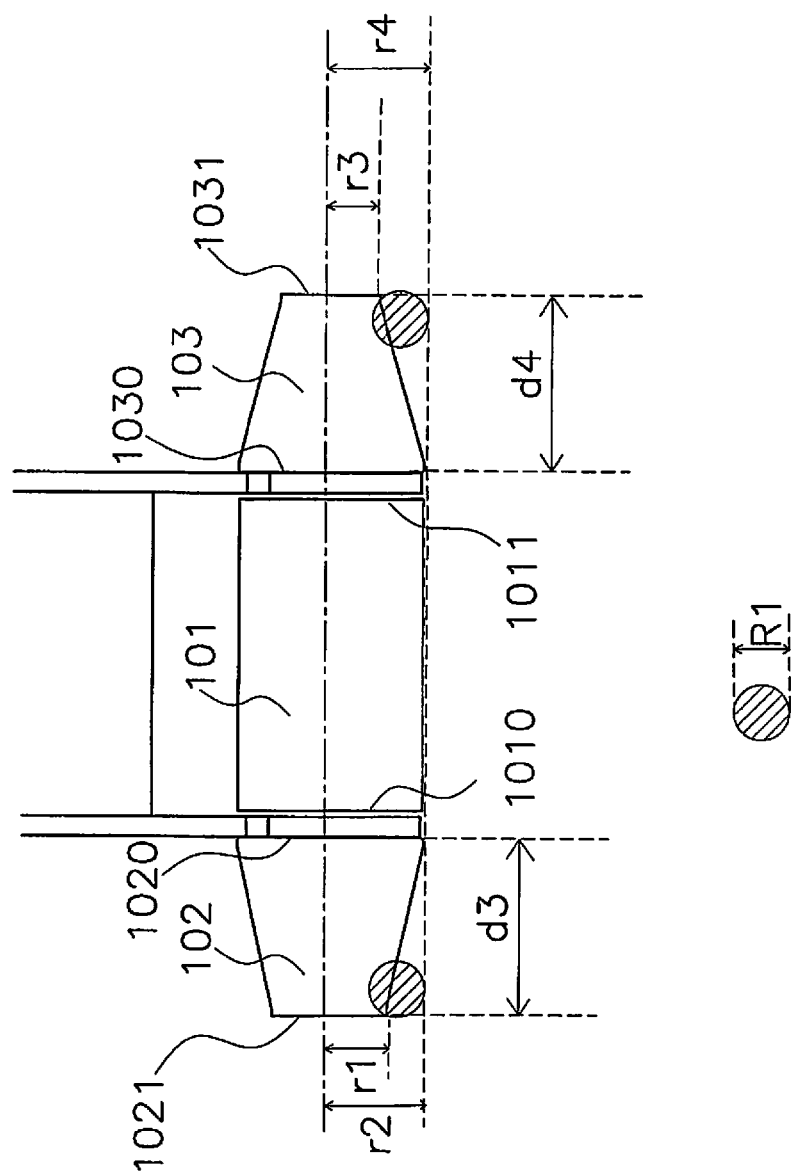
FIG. 19 is a diagram for explaining a relation between taper shapes and the wire rope in the pipelayer illustrated in FIG. 1.
Figure 19:
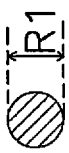

FIG. 19 is a diagram for explaining a relation between the taper shapes and the wire rope. As illustrated in FIG. 19, d3 and d4 are greater than R1, where the width of the first roller end part 102 is set as d3; the width of the second roller end part 103 is set as d4; and the diameter of the wire rope is set as R1. With such formation, the wire rope portion can be disposed on the taper shaped portion by the amount corresponding to the width thereof. Therefore, at least the portion of the wire rope 83, disposed at the end 200a, 200b, can be appropriately moved to a wire rope groove formed adjacently thereto.

Further, as illustrated in FIG. 19, the following formulas are established: $r2-r1 \leq R1$; and $r4-r3 \leq R1$, where the radius of the outer end 1021 (small radius end) of the first roller end part 102 is set as r1; the radius of the inner end 1020 (large diameter end) of the first roller end part 102 is set as r2; the radius of the outer end 1031 of the second roller end part 103 is set as r3; and the radius of the inner end 1030 of the second roller end part 103 is set as r4.

In short, as illustrated in FIGS. 16 and 17, when the wire rope is turned back from the lower layer to the upper layer, the wire rope portion on the upper layer is required to be restrained. Hence, when the aforementioned formulas are not satisfied, chances are that the wire rope portion located at the end cannot be restrained. However, when the aforementioned formulas are satisfied, the portion of the wire rope 83 disposed at the end 200a, 200b can be restrained by the taper shape. It should be noted that the diameter R1 of the wire rope 83 is, for instance, 20 mm; d3 and d4 can be set to be 75 mm; r2−r1 can be set to be 7.9 mm; and r4−r3 can be set to be 15.3 mm.

The hook winch 8 (an example of a winch) of the present exemplary embodiment includes the hook drum 80 (an example of a drum) and the restraining roller 100 (an example of a restraining roller). The hook drum 80 is a member that the wire rope 83 is wound thereabout. The restraining roller 100 is disposed along the width direction of the hook drum 80, and restrains the wire rope 83 wound about the hook drum 80 onto the surface of the hook drum 80.

The restraining roller 100 includes the roller middle part 101 (an example of a roller part), the first roller end part 102 (an example of a roller end part on a first end side) and the second roller end part 103 (an example of a roller end part on a second end side). The roller middle part 101 is formed in a columnar shape. The first roller end part 102 and the second roller end part 103 are disposed on the first-end 1010 side (an example of a first end side) and the rear-end 1011 side (an example of a second end side) of the roller middle part 101 in the width direction, and each is formed in a roughly circular truncated cone shape with a radius reduced in proportion to distance from the front end 1010 or the rear end 1011. The width of the first roller end part 102 and that of the second roller end part 103 are respectively greater than the diameter of the wire rope 83. A difference in diameter between the inner end 1020 and the outer end 1021 of the first roller end part 102 and that between the inner end 1030 and the outer end 1031 of the second roller end part 103 are less than the diameter of the wire rope 83. Where in a plan view seen in a direction perpendicular to the center axis S2 of the restraining roller 100, the taper angle θ3 is defined as the angle formed between the line L6 arranged in parallel to the surface of the roller middle part 101 and the line L7 arranged in parallel to the surface of the first roller end part 102; and the taper angle θ4 is defined as the angle formed between the line L6 arranged in parallel to the surface of the roller middle part 101 and the line L8 arranged in parallel to the surface of the second roller end part 103, the taper angle of the first roller end part 102 and that of the second roller end part 103 are different from each other.

Thus, as illustrated in FIG. 19, by setting the width of the first roller end part 102 and that of the second roller end part 103 to be greater than the diameter R1 of the wire rope 83, the wire rope 83 can be disposed on the taper shaped portion at least by the amount corresponding to the width (R1). Further, the wire rope can be restrained by the taper shape by setting the difference in radius between the inner end and the outer end of the first roller end part 102 and that between the inner end and the outer end of the second roller end part 103 to be less than or equal to the diameter of the wire rope.

Thus, an outward force (thrust resistive force) is generated in the wire rope 83 that is being restrained by the taper shape. Therefore, even when a force (thrust force) for inwardly moving the wire rope in winding up the wire rope is large, the force can be counteracted.

In other words, by generating the appropriate thrust resistive force with the taper shape, it is possible to counteract the thrust force and suppress occurrence of uneven winding.

In the present exemplary embodiment, the fleet angle θ2 is greater than the fleet angle θ1. Hence, the taper angle θ4 is formed so as to be greater than the taper angle θ3.

In other words, when the fleet angle θ becomes greater, the force to pull the wire rope 83 at the end (e.g., 200a, 200b) towards the middle becomes greater, and thereby the thrust force becomes greater. To counteract the thrust force, the thrust resistive force is required to be increased. The thrust resistive force can be increased by increasing the taper angle.

In other words, appropriate inward moving of the wire rope can be implemented by increasing the taper angle in proportion to increase in the fleet angle.

In the hook winch 8 of the aforementioned exemplary embodiment, the hook drum 80 includes the drum body 200, the first flange portion 201 and the second flange portion 202. The drum body 200 is a part that the wire rope 83 is wound thereabout in layers, and is formed in a columnar shape. The first flange portion 201 and the second flange portion 202 are disposed on the end 200a and the end 200b corresponding to the both ends of the drum body 200.

Winding the wire rope 83 in layers means that the wire rope 83 is sequentially disposed on the drum body 200 from the end 200b (an example of a first end) towards the end 200a (an example of a second end) such that wound portions thereof are disposed side by side, and the wire rope 83 is further sequentially disposed from the end 200a towards the end 200b on the upper side of the wound portions disposed side by side such that further wound portions thereof are disposed side by side. The groove 205a (an example of a first groove) is formed on the end 200a (an example of a second end) of the drum body 200 on which the wire rope 83 is moved from the first layer (an example of a lower layer) to the second layer (an example of an upper layer) such that a portion of the wire rope 83 located at the end 200a of the first layer is fitted thereto.

Also, winding of the wire rope 83 in layers means that the wire rope 83 is sequentially disposed on the drum body 200 from the end 200a (an example of a first end) towards the end 200b (an example of a second end) such that wound portions thereof are disposed side by side, and the wire rope 83 is further sequentially disposed from the end 200b towards the end 200a on the upper side of the wound portions disposed side by side such that further wound portions thereof are disposed side by side. The groove 207a (an example of a first groove) is formed on the end 200b (an example of a second end) of the drum body 200 on which the wire rope 83 is moved from the second layer (an example of a lower layer) to the third layer (an example of an upper layer) such that a portion of the wire rope 83 located at the end 200b of the third layer is fitted thereto.

Thus, by fitting the wire rope portion located at the end to the groove, it is possible to fix the position of the wire rope at the end. By fixing the position of the wire rope portion at the end, when being wound up and inwardly moved, the wire rope can be wound up such that the wound portion thereof is disposed adjacently to the wire rope portion located at the end.

In other words, it is possible to perform positioning of the wire rope portion serving as the reference in winding up the wire rope. Hence, the wire rope can be orderly wound up.

As illustrated in FIG. 16, in the hook winch 8 of the aforementioned exemplary embodiment, the first flange portion 201 disposed on the end 200a (an example of a second end) side has the first kicker portion 206 (an example of a protruded portion). The first kicker portion 206 moves the wire rope portion 83b disposed in the groove 205a (an example of a first groove) to the wire rope groove 83d (an example of a second groove) formed by the wire rope portion 83a located at the end of the first layer on the end 200a side and the wire rope portion 83c disposed adjacently thereto.

Further, as illustrated in FIG. 17, in the hook winch 8 of the exemplary embodiment, the second flange portion 202 disposed on the end 200b (an example of a second end) side has the second kicker portion 208 (an example of a protruded portion). The second kicker portion 208 moves the wire rope portion 83e disposed in the groove 207a (an example of a first groove) to the wire rope groove 83h (an example of a second groove) formed by the wire rope portion 83f located at the end of the second layer on the end 200b side and the wire rope portion 83g disposed adjacently thereto.

Thus, with the first kicker portion 206 and the second kicker portion 208 herein provided, the wire rope portion fixed at the end can be disposed in the wire rope groove 83d, 83h formed inwardly adjacent thereto across the wire rope portion 83a, 83f on the lower layer.

Accordingly, the wire rope can be orderly wound up.

In the hook winch 8 according to the aforementioned exemplary embodiment, the drum body 200 has the plural mount grooves 204 on the surface thereof such that the wire rope 83 is disposed therein. As illustrated in FIG. 12, an angle of less than or equal to 4 degrees is formed as the fleet angle θ5 of the wire rope 83 paid out from the surface of the drum in the position opposed to the end 1020 of the first roller end part 102 that is the end located on the opposed side to the roller middle part 101. Further, as illustrated in FIG. 12, an angle of less than or equal to 4 degrees is formed as the fleet angle θ6 of the wire rope 83 paid out from the surface of the drum in the position opposed to the end 1030 of the second roller end part 103 that is the end located on the opposed side to the roller middle part 101.

In short, when the mount grooves 204 are formed on the surface of the drum body 200, chances are that uneven winding is caused by the thrust force when the fleet angle exceeds 4 degrees. However, as with the present exemplary embodiment, occurrence of uneven winding attributed to the thrust force can be suppressed by forming the taper shape on the part that the angle exceeds 4 degrees.

The pipelayer 1 of the aforementioned exemplary embodiment includes the hook 5 and the hook winch 8 for moving up and down the hook 5.

Thus, it is possible to provide the pipelayer 1 that can suppress occurrence of uneven winding with the simple structure that the taper shapes are formed on the end parts of the restraining roller 100 for restraining the wire rope 83 wound about the hook drum 80.

The pipelayer 1 of the aforementioned exemplary embodiment includes the second pulley 82 for hook (an example of a sheave), the boom 4 and the boom drum 70 (an example of a drum for boom). The second pulley 82 for hook is a member over which the wire rope 83 for moving up and down the hook 5 is wrapped. The boom 4 is a member that the hook 5 is hung therefrom. The boom drum 70 is concentrically disposed in alignment with the hook drum 80 (an example of a drum for hook) on the axis S1. The boom drum 70 is a member that the wire rope 73 for raising and lowering the boom 4 is wound thereabout.

The second pulley 82 for hook has the rotational axis S4 arranged in parallel to the rotational axis S1 of the hook drum 80. The second pulley 82 for the hook is disposed closer to the boom drum 70 from the width directional center (see C1 in FIG. 11(*b*)) of the hook drum 80 in a plan view seen in a direction perpendicular to the rotational axis S1. The first roller end part 102 (an example of a roller end part on a first end side) is disposed on the side that the boom drum 70 is disposed. The taper angle θ3 of the first roller end part 102 (an example of a roller end part on a first end side) is less than the taper angle θ4 of the second roller end part 103 (an example of a roller end part on a second end side).

By thus concentrically disposing the hook drum 80 and the boom drum 70, the second pulley 82 for the hook cannot be disposed in the middle of the hook drum 80 in the width direction. Therefore, chances are that the fleet angle becomes greater at the end of the hook drum 80. However, as with the present exemplary embodiment, occurrence of uneven winding can be suppressed by forming the taper shapes on the end parts of the restraining roller 100.

In other words, it is possible to change the position that the second pulley 82 for the hook is disposed only by forming the taper shapes on the end parts of the restraining roller 100. Accordingly, the position of the second pulley 82 for hook can be determined in consideration of arrangement of the other elements. Hence, this makes design easy.

As illustrated in FIG. 12, the fleet angle becomes greater on the end part located farther away from the second pulley 82 for hook than on the other end part. Therefore, occurrence of uneven winding attributed to the thrust force can be suppressed by increasing the taper angle that the fleet angle becomes greater.

Other Exemplary Embodiments

An exemplary embodiment of the present invention has been explained above. However, the present invention is not limited to the aforementioned exemplary embodiment, and a variety of changes can be made without departing from the scope of the present invention.

In the present exemplary embodiment, the second roller end part 103 is disposed farther away from the second pulley 82 for hook than the first roller end part 102 is. Hence, the taper angle on the second roller end part 103 is formed to be greater than that on the first roller end part 102. However, when the second roller end part 103 is disposed closer to the second pulley 82 for hook than the first roller end part 102 is, the taper angle on the second roller end part 103 may be formed to be less than that on the first roller end part 102.

Further, in the aforementioned exemplary embodiment, the taper shapes are formed on both end parts of the restraining roller 100. However, when the fleet angle on one end of the hook drum 80 is small to the extent that uneven winding is not caused, the taper shape is not required to be formed on the one end. In other words, the taper shape is required to be formed only on the end part that the fleet angle is great to the extent that there are chances of occurrence of uneven winding.

The mount grooves 204 for winding-up are formed on the surface of the drum body 200 of the hook winch 8 of the aforementioned exemplary embodiment. However, the mount grooves 204 for winding-up may not be formed thereon. In this example, the angle θ5 represented in FIG. 12 is, for instance, less than or equal to 2 degrees. On the other hand, the angle θ6 represented in FIG. 12 is less than or equal to 2 degrees.

In other words, where the mount grooves 204 are not formed on the surface of the drum body 200, chances are that uneven winding is caused due to the thrust force when the fleet angle exceeds 2 degrees. However, it is possible to suppress occurrence of uneven winding attributed to the thrust force by forming the taper shape on the part that the angle exceeds 2 degrees as with the present exemplary embodiment.

The aforementioned exemplary embodiment has been explained by exemplifying the hook winch of the pipelayer. However, the present invention is not limited to this. In other words, the application of the present invention is not limited to the winch for the hook. Alternatively, the present invention may be applied to the winch for the boom.

Further, the application of the present invention may not be limited to the winch of the pipelayer. Alternatively, the present invention may be applied to a crane and so forth.

The winch of the present invention has an advantageous effect that occurrence of uneven winding can be suppressed, and is applicable to a winch for hook of a pipelayer and so forth.

The invention claimed is:
1. A winch for a pipelayer, comprising:
   a drum about which a wire rope is wound; and
   a restraining roller disposed along a width direction of the drum, the restraining roller restraining the wire rope wound about the drum onto a surface of the drum, wherein the restraining roller includes:
a roller part being formed in a cylindrical shape; and
roller end parts being disposed on a first end side and a second end side of the roller part in the width direction, each of the roller end parts being formed in a roughly circular truncated cone shape with a radius reduced in proportion to a distance from the first end side or the second end side,
a width of each of the roller end parts is greater than a diameter of the wire rope,
a difference in diameter between an inner end and an outer end of each of the roller end parts is less than the diameter of the wire rope, and
where a taper angle is defined as an angle formed between a line arranged in parallel to a surface of the roller part and a line arranged in parallel to a surface of each of the roller end parts in a plan view seen in a direction perpendicular to a center axis of the restraining roller, the taper angle of the roller end part on the first end side and the taper angle of the roller end part on the second end side are different from each other.

2. The winch for a pipelayer according to claim 1, wherein the drum includes:
a drum body being formed in a cylindrical shape about which the wire rope is wound in layers; and
flange portions being disposed on a first end and a second end corresponding to both ends of the drum body,
winding the wire rope in layers such that the wire rope is sequentially disposed on the drum body from the first end toward the second end such that wound portions thereof are disposed side by side, and the wire rope is further sequentially disposed from the second end towards the first end on an upper side of the wound portions disposed side by side such that further wound portions thereof are disposed side by side, and
a first groove is formed on the second end of the drum body on which the wire rope is moved from a lower layer to an upper layer such that a portion of the wire rope located at an end of the upper layer on the second end side is fitted to the first groove.

3. The winch for a pipelayer according to claim 2, wherein the flange portion disposed on the second end side has a protruded portion for moving the wire rope portion disposed in the first groove to a second groove formed by a wire rope portion located at an end of the lower layer on the second end side and a wire rope portion disposed adjacently thereto.

4. The winch for a pipelayer according to claim 1, wherein an angle of less than or equal to 2 degrees is formed as a fleet angle of the wire rope paid out from the surface of the drum in a position opposed to one end of each of the roller end parts that is an end located on an opposed side to the roller part.

5. The winch for a pipelayer according to claim 2, wherein the drum body has a plurality of mount grooves on a surface thereof such that the wire rope is disposed therein, and
an angle of less than or equal to 4 degrees is formed as a fleet angle of the wire rope paid out from the surface of the drum in a position opposed to one end of each of the roller end parts that is an end located on an opposed side to the roller part.

6. A pipelayer including the winch according to claim 1, further comprising:
a hook being moved upwardly and downwardly by the winch, wherein
the wire rope for moving the hook upwardly and downwardly is wound about the drum.

7. The pipelayer according to claim 6, further comprising:
a sheave over which the wire rope for moving up and down the hook is wrapped;
a boom from which the hook is hung; and
a boom drum being concentrically disposed in alignment with the drum and about which a wire rope for raising and lowering the boom is wound, wherein
the sheave has a rotational axis arranged parallel to a rotational axis of the drum, the sheave being disposed closer to the boom drum than a width directional center of the drum in a plan view seen in a direction perpendicular to the rotational axes,
the roller end part on the first end side is disposed on a side of the roller part that the boom drum is disposed, and
the taper angle of the roller end part on the first end side is less than the taper angle of the roller end part on the second end side.

8. A pipelayer including the winch according to claim 2, further comprising:
a hook being moved upwardly and downwardly by the winch,
wherein the wire rope for moving the hook upwardly and downwardly is wound about the drum.

9. The pipelayer according to claim 8, further comprising:
a sheave over which the wire rope for moving up and down the hook is wrapped;
a boom from which the hook is hung; and
a boom drum being concentrically disposed in alignment with the drum and about which a wire rope for raising and lowering the boom is wound, wherein
the sheave has a rotational axis arranged parallel to a rotational axis of the drum, the sheave being disposed closer to the boom drum than a width directional center of the drum in a plan view seen in a direction perpendicular to the rotational axes,
the roller end part on the first end side is disposed on a side of the roller part that the boom drum is disposed, and
the taper angle of the roller end part on the first end side is less than the taper angle of the roller end part on the second end side.

10. A pipelayer including the winch according to claim 4, further comprising:
a hook being moved upwardly and downwardly by the winch,
wherein the wire rope for moving the hook upwardly and downwardly is wound about the drum.

11. The pipelayer according to claim 10, further comprising:
a sheave over which the wire rope for moving up and down the hook is wrapped;
a boom from which the hook is hung; and
a boom drum being concentrically disposed in alignment with the drum and about which a wire rope for raising and lowering the boom is wound, wherein
the sheave has a rotational axis arranged parallel to a rotational axis of the drum, the sheave being disposed closer to the boom drum than a width directional center of the drum in a plan view seen in a direction perpendicular to the rotational axes,
the roller end part on the first end side is disposed on a side of the roller part that the boom drum is disposed, and the taper angle of the roller end part on the first end side is less than the taper angle of the roller end part on the second end side.

12. A pipelayer including the winch according to claim 5, further comprising:
   a hook being moved upwardly and downwardly by the winch,
   wherein the wire rope for moving the hook upwardly and downwardly is wound about the drum.

13. The pipelayer according to claim 12, further comprising:
   a sheave over which the wire rope for moving up and down the hook is wrapped;
   a boom from which the hook is hung; and
   a boom drum being concentrically disposed in alignment with the drum and about which a wire rope for raising and lowering the boom is wound, wherein
   the sheave has a rotational axis arranged parallel to a rotational axis of the drum, the sheave being disposed closer to the boom drum than a width directional center of the drum in a plan view seen in a direction perpendicular to the rotational axes,
   the roller end part on the first end side is disposed on a side of the roller part that the boom drum is disposed, and
   the taper angle of the roller end part on the first end side is less than the taper angle of the roller end part on the second end side.

\* \* \* \* \*